(12) United States Patent
Ogasawara et al.

(10) Patent No.: US 11,814,818 B2
(45) Date of Patent: Nov. 14, 2023

(54) FATIGUE MANAGEMENT SYSTEM

(71) Applicant: Hitachi Construction Machinery Co., Ltd., Tokyo (JP)

(72) Inventors: Keita Ogasawara, Ibaraki (JP); Akio Hoshi, Ibaraki (JP); Shunichi Suda, Ibaraki (JP); Hiroshi Kanezawa, Chiba (JP); Takeshi Shiina, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 203 days.

(21) Appl. No.: 17/435,896

(22) PCT Filed: Sep. 30, 2019

(86) PCT No.: PCT/JP2019/038470
§ 371 (c)(1),
(2) Date: Sep. 2, 2021

(87) PCT Pub. No.: WO2021/064776
PCT Pub. Date: Apr. 8, 2021

(65) Prior Publication Data
US 2022/0178115 A1    Jun. 9, 2022

(51) Int. Cl.
*E02F 9/26* (2006.01)
*G06T 7/00* (2017.01)

(52) U.S. Cl.
CPC .............. *E02F 9/267* (2013.01); *E02F 9/265* (2013.01); *G06T 7/0004* (2013.01)

(58) Field of Classification Search
CPC ......... E02F 9/2054; E02F 9/265; E02F 9/267; G01M 17/00; G06Q 10/00; G06Q 50/10; G06T 7/0004
See application file for complete search history.

(56) References Cited

U.S. PATENT DOCUMENTS 6,314,818 B1 * 11/2001 Mandon ............... E02F 9/24
  73/781
9,315,970 B2 * 4/2016 Chitty ............... G07C 5/006
(Continued)

FOREIGN PATENT DOCUMENTS

CN    104515685 B    10/2017
JP    2007-206007 A    8/2007
(Continued)

OTHER PUBLICATIONS

International Search Report (PCT/ISA/210) issued in PCT Application No. PCT/JP2019/038470 dated Dec. 17, 2019 with English translation (five (5) pages).
(Continued)

*Primary Examiner* — Tyler J Lee
(74) *Attorney, Agent, or Firm* — Crowell & Moring LLP

(57) ABSTRACT

The present disclosure provides a fatigue management system capable of managing fatigue of each portion of a construction machine more accurately than conventional systems. The fatigue management system S includes: a stress calculation section S1 that calculates stress acting on a plurality of portions of the construction machine based on the output of a sensor 18 attached to a part of the construction machine; a damage degree calculation section S2 that calculates the cumulative damage degree of each portion of the construction machine based on the stress calculated by the stress calculation section S1; and an index value calculation section S3 that calculates a fatigue index value, which is a weighted value of the cumulative damage degree, for each portion.

8 Claims, 18 Drawing Sheets

(56) References Cited

U.S. PATENT DOCUMENTS

| | | | | |
|---|---|---|---|---|
| 10,048,154 | B2* | 8/2018 | Claxton | G01L 25/00 |
| 10,620,082 | B2* | 4/2020 | Unuma | G01M 5/0033 |
| 2010/0100338 | A1 | 4/2010 | Vik et al. | |
| 2014/0244101 | A1 | 8/2014 | Chitty et al. | |
| 2018/0293552 | A1* | 10/2018 | Zhang | G06Q 10/06395 |

FOREIGN PATENT DOCUMENTS

| | | |
|---|---|---|
| JP | 2012-160085 A | 8/2012 |
| JP | 2014-163047 A | 9/2014 |
| JP | 2016-3462 A | 1/2016 |
| JP | 2019-49419 A | 3/2019 |
| WO | WO 2013/172277 A1 | 11/2013 |

OTHER PUBLICATIONS

Japanese-language Written Opinion (PCT/ISA/237) issued in PCT Application No. PCT/JP2019/038470 dated Dec. 17, 2019 (three (3) pages).
Australian Office Action issued in Australian Application No. 2019468667 dated Nov. 18, 2022 (six (6) pages).
Extended European Search Report issued in European Application No. 19947931.2 dated May 12, 2023 (4 pages).

* cited by examiner

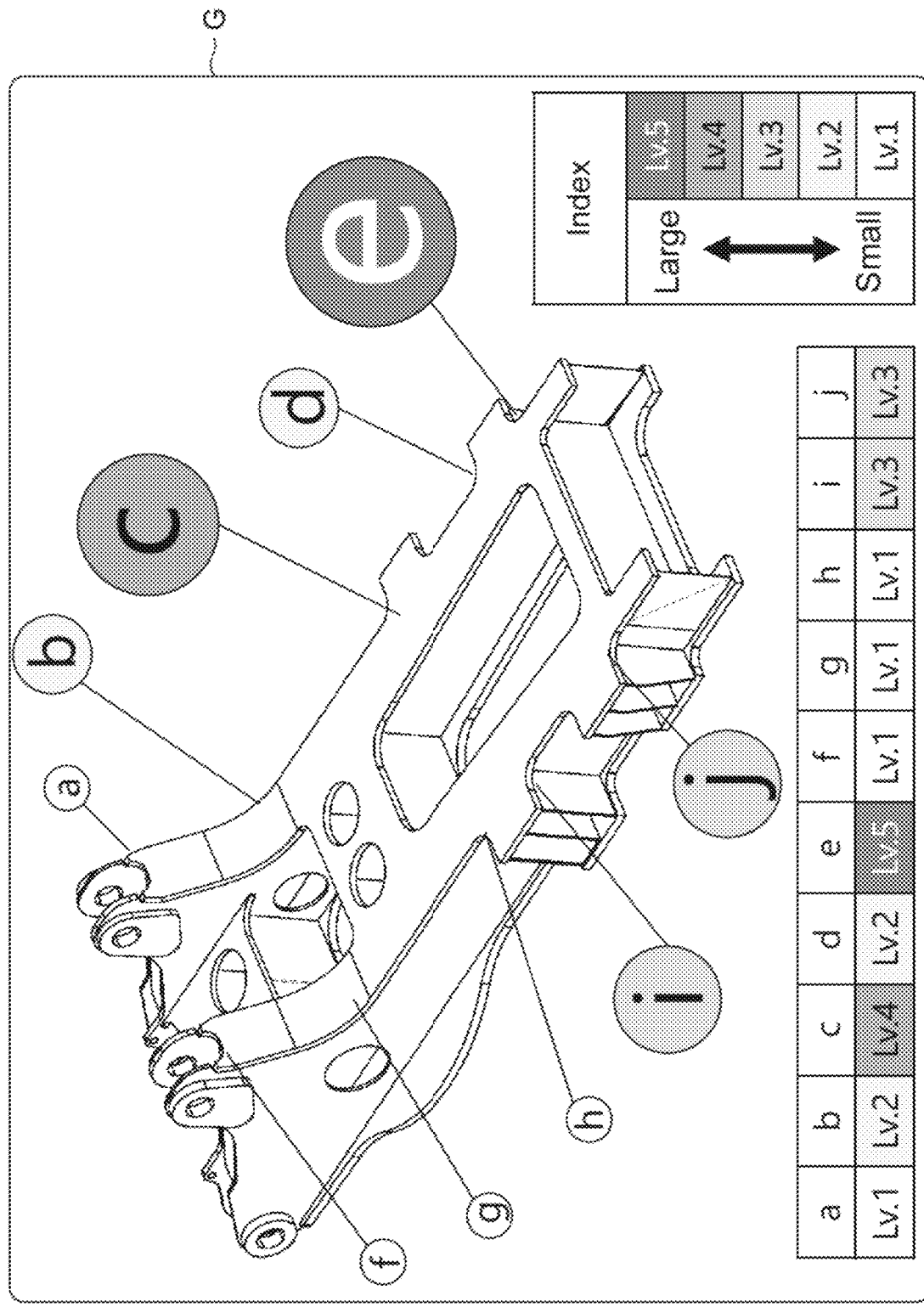

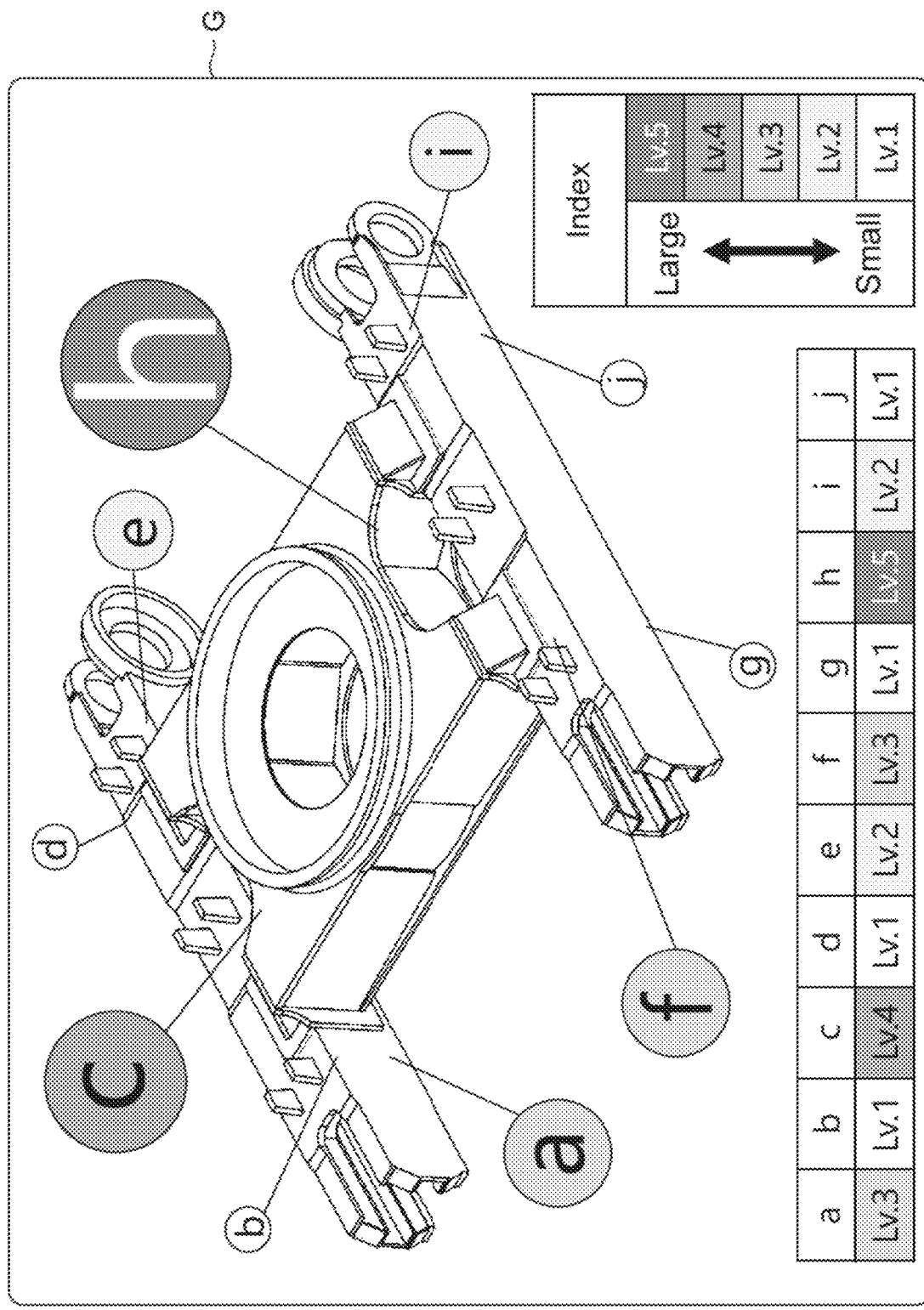

FATIGUE MANAGEMENT SYSTEM

TECHNICAL FIELD

The present disclosure relates to fatigue management systems for construction machine.

BACKGROUND ART

Conventionally inventions about an excavator support device have been known, which assists in detecting incompatibility (mismatching) of a combination of the work content or the work environment with the excavator in operation (see Patent Literature 1 below). This conventional invention aims to provide an excavator support device capable of accurately determining whether or not an excavator in operation is suitable for the current work and work environment.

According to one aspect of this conventional invention, an excavator support device includes a display screen that displays an image and a processor that controls the display screen to display an image thereon (see the same literature, claim 1, paragraph 0005, for example). The processor acquires the time history of the evaluation values about the cumulative damage degree that is accumulated in the parts of an excavator to be evaluated. The processor compares the evaluation values of cumulative damage degree with a threshold for determination, which increases with operating time. The threshold is for determining whether or not the excavator to be evaluated is in a mismatch condition. If the evaluation value exceeds the threshold, the processor then notifies that the excavator to be evaluated is in a mismatch state.

To calculate the cumulative damage degree, the processor uses the operation information or the cumulative damage degree up to the present time that are stored in the memory. For instance, the cumulative damage degree can be obtained by analyzing the stress waveform applied to each evaluation point of the part based on the cumulative fatigue damage rule (see the same literature, paragraph 0024, for example). Specifically, the cumulative damage degree is determined as follows (see the same literature, paragraphs 0064-0076, for example).

First, the measurements for at least one cycle of a series of operations repeated during work by the excavator are acquired from the attitude sensor of the attachment, the load sensor of the attachment, and the turning angle sensor. Next, multiple timings to be analyzed (hereinafter referred to as "analysis times") are extracted from one cycle of a series of operations. Next, at each of the analysis times, the distribution of stress applied to each of the parts such as the boom and the arm is calculated using the analysis model.

Next, a single-cycle damage degree is calculated for each evaluation point of each part, which indicates the damage degree accumulated during one cycle of the operation period. Next, the cumulative damage degree is calculated, which is the sum of the single-cycle damage degrees from the start of operation of the machine to the present time for each excavator to be managed and for each component, to calculate the distribution of the cumulative damage degrees of the parts. Next, the calculated cumulative damage degree is stored in the memory in association with information of the excavator, such as the machine number. In this way, the cumulative damage degree is obtained for each excavator and each evaluation point of the parts.

CITATION LIST

Patent Literature

Patent Literature 1: JP 2016-003462 A

SUMMARY OF INVENTION

Technical Problem

The cumulative damage degree used in the conventional excavator support device is based on the linear cumulative damage rule, which is an empirical rule, and assumes that the object will undergo fatigue fracture when the cumulative damage degree reaches 1. Note here that the cumulative damage degree is a value that inherently includes fluctuations, and in reality, an object may undergo fatigue failure before the cumulative damage degree reaches 1, or the object may not undergo fatigue failure even if the cumulative damage degree exceeds 1. The conventional excavator support device, which uses the cumulative damage degree as it as, may fail to appropriately set the inspection timing for each excavator part.

The present disclosure provides a fatigue management system capable of managing the fatigue of each portion of a construction machine more accurately than conventional systems.

Solution to Problem

An aspect of the present disclosure is a fatigue management system that includes: a stress calculation section configured to calculate stress acting on a plurality of portions of a construction machine based on an output of a sensor attached to a part of the construction machine; a damage degree calculation section configured to calculate cumulative damage degree of each portion based on the stress; and an index value calculation section configured to calculate a fatigue index value, which is a weighted value of the cumulative damage degree, for each portion.

Advantageous Effects of Invention

According to the present disclosure, it is able to provide a fatigue management system that is capable of managing fatigue of each portion of a construction machine more accurately than conventional systems by using a fatigue index value.

BRIEF DESCRIPTION OF DRAWINGS

FIG. 7B shows an example of the image displayed on the monitor in the fatigue management system shown in FIG. 2.

FIG. 7C shows an example of the image displayed on the monitor in the fatigue management system shown in FIG. 2.

DESCRIPTION OF EMBODIMENTS

Figure 1:
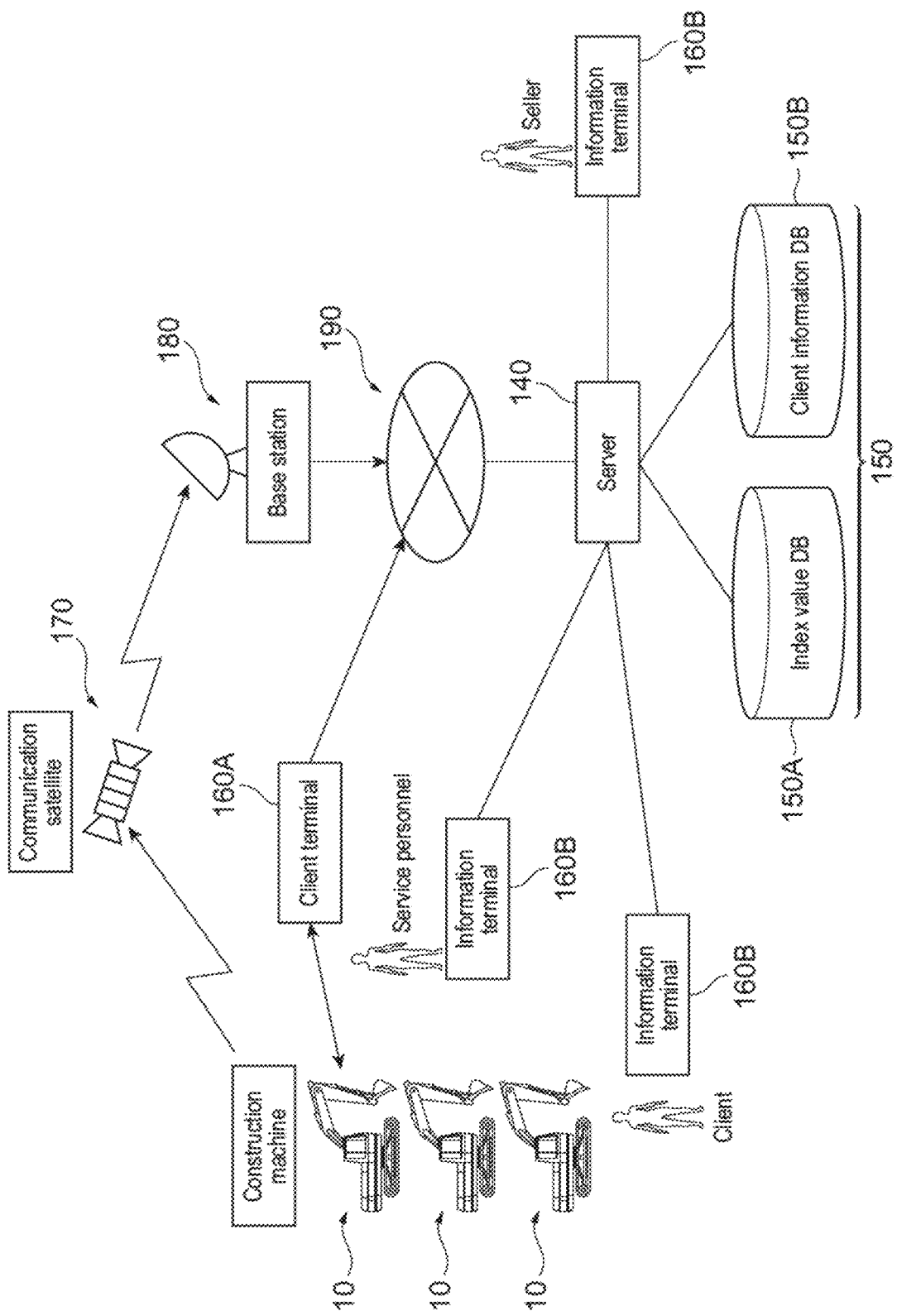
FIG. 1 is a block diagram showing an application example of the fatigue management system according to the present disclosure.

Referring to the drawings, the following describes a fatigue management system according to one embodiment of the present disclosure.

Figure 2:
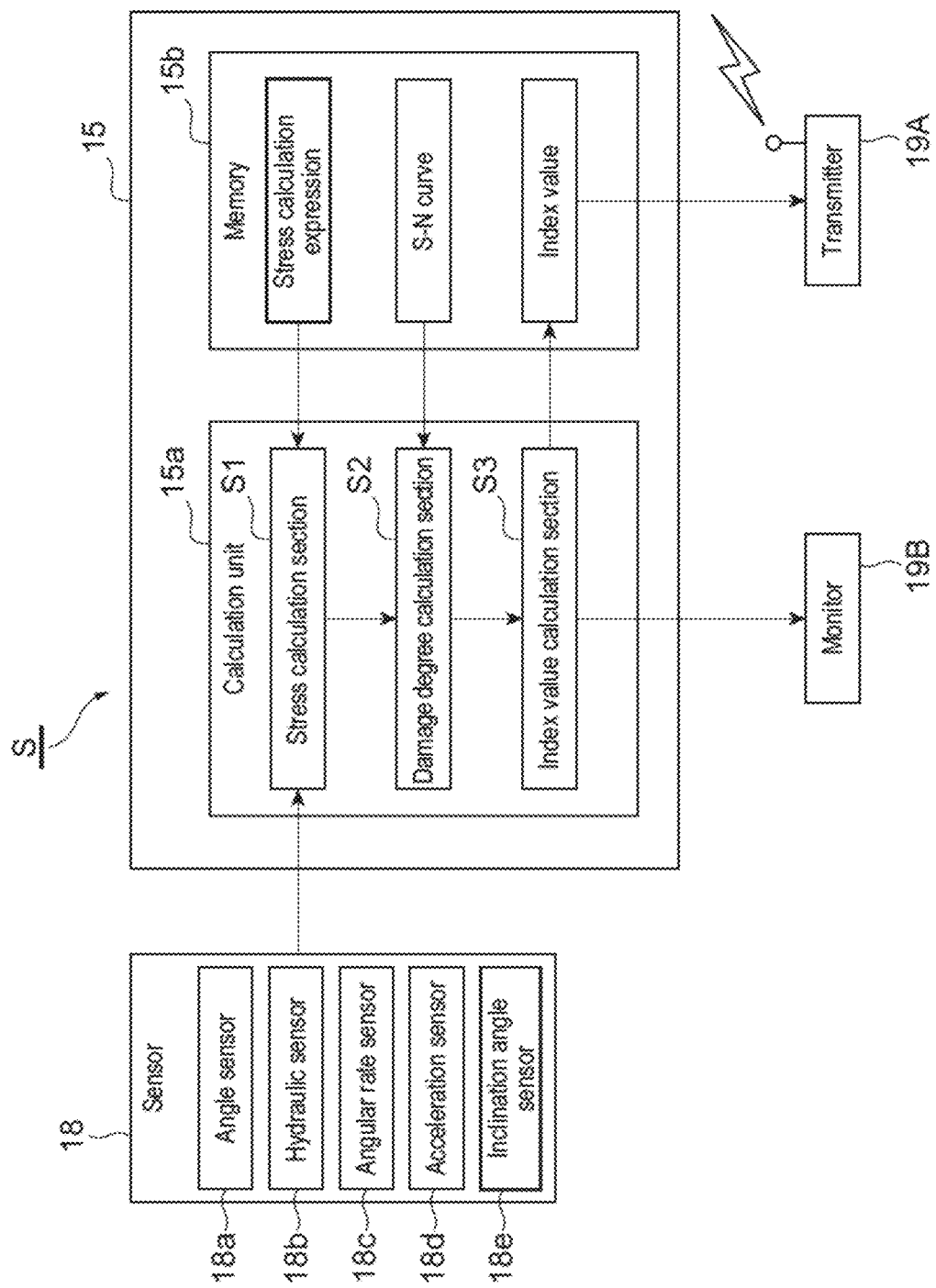
FIG. 2 is a block diagram showing an embodiment of the fatigue management system according to the present disclosure.
Figure 3:
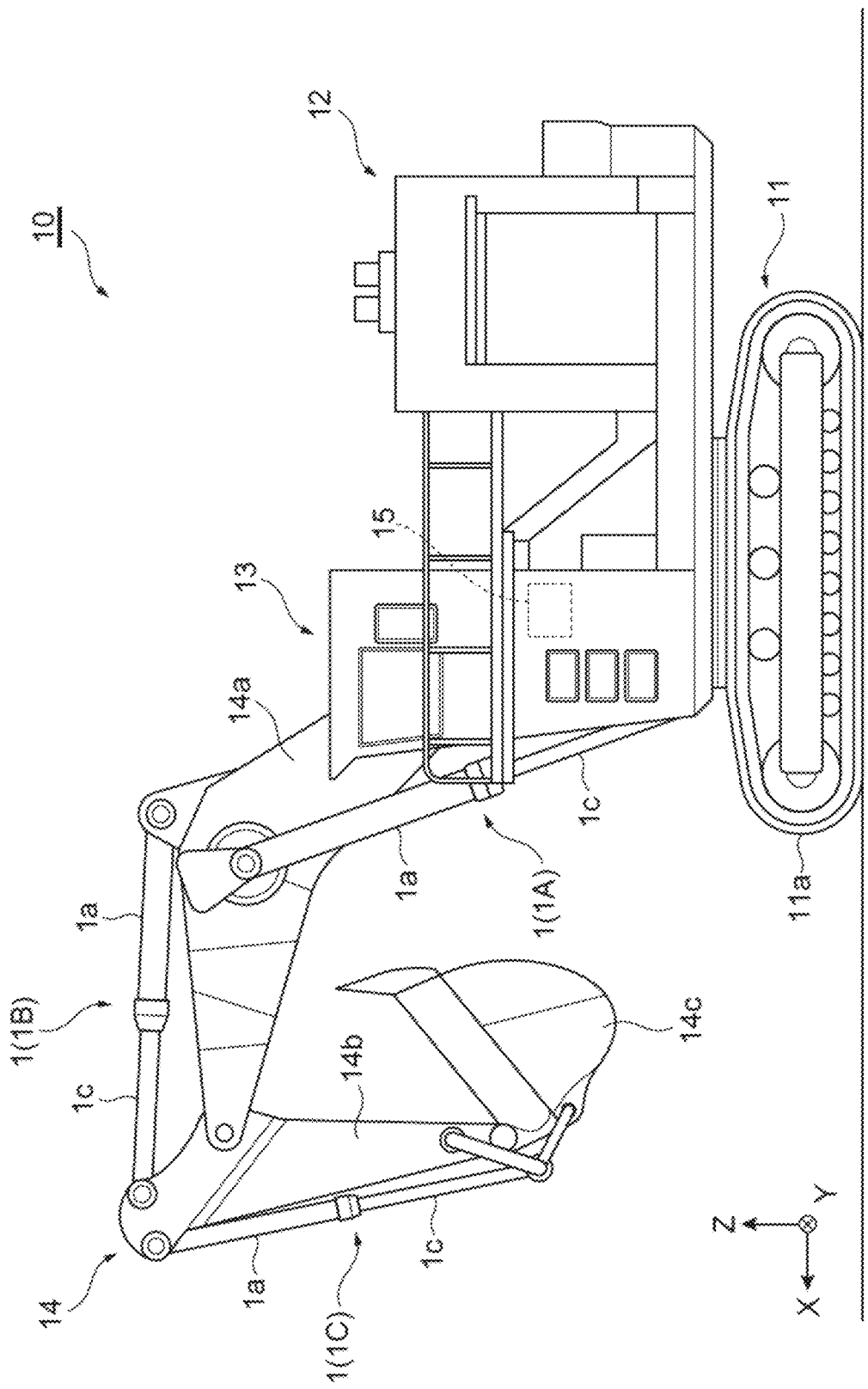
FIG. 3 is a side view of a hydraulic excavator to be managed by the fatigue management system of FIG. 2.
Figure 4:
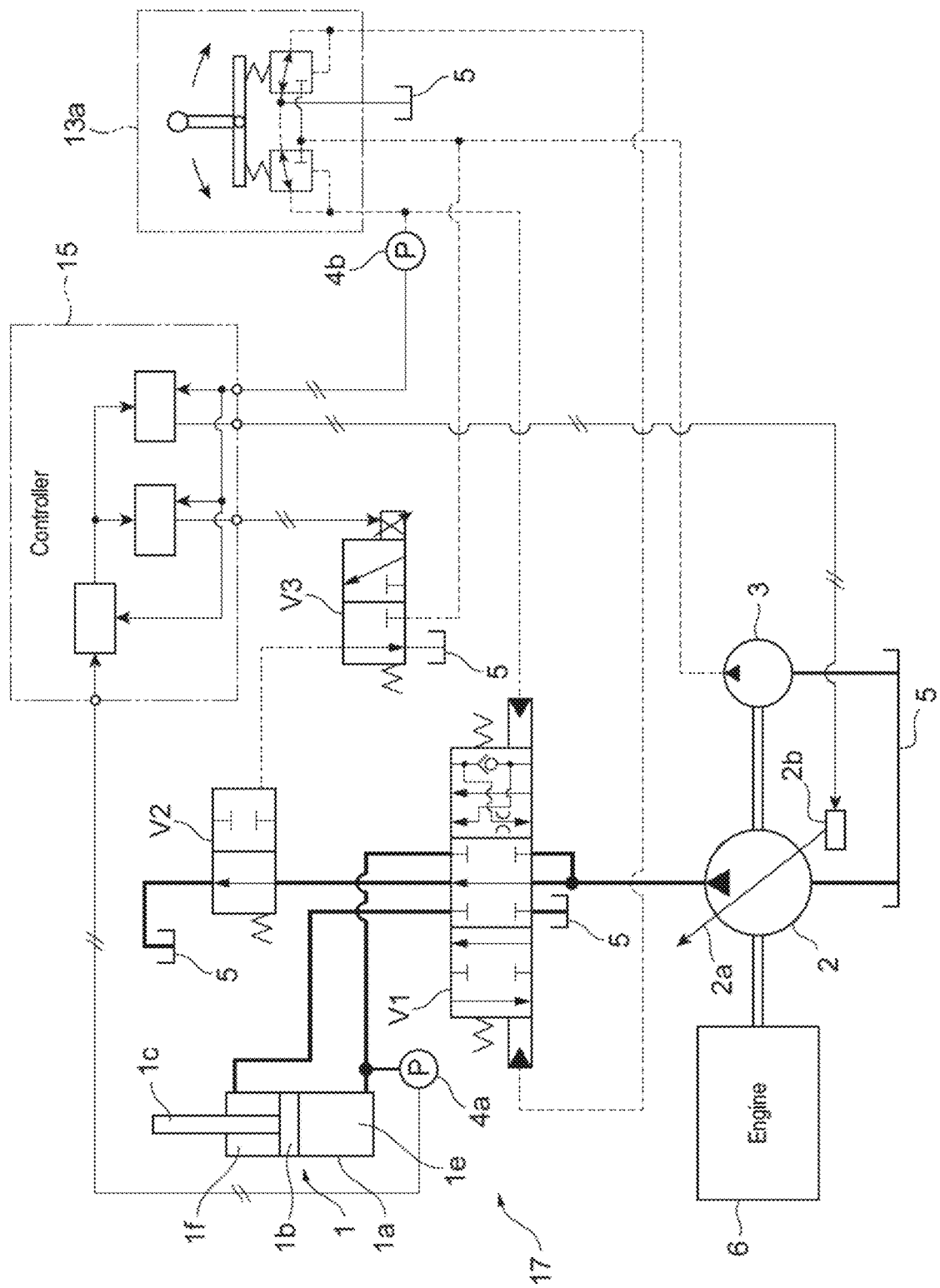
FIG. 4 is a block diagram showing the configuration of a hydraulic driver of the hydraulic excavator shown in FIG. 3.

FIG. 1 is a block diagram showing an application example of the fatigue management system according to the present disclosure. FIG. 2 is a block diagram showing an embodiment of the fatigue management system according to the present disclosure. FIG. 3 is a side view of a hydraulic excavator 10, which is an example of a construction machine. FIG. 4 is a block diagram showing an example of the configuration of a hydraulic driver 17 in the hydraulic excavator 10 shown in FIG. 3.

As will be described in detail later, the fatigue management system S of the present embodiment has the following structure as its main features. The fatigue management system S includes a stress calculation section S1 that calculates the stress acting on a plurality of portions of the construction machine based on the output of a sensor 18 (see FIG. 2) attached to a part of the construction machine. The fatigue management system S also includes a damage degree calculation section S2 that calculates the cumulative damage degree of each portion of the construction machine based on the stress calculated by the stress calculation section S1. The fatigue management system S also includes an index value calculation section S3 that calculates a fatigue index value, which is a weighted value of the cumulative damage degree calculated by the damage degree calculation section S2, for each portion of the construction machine.

The construction machine, an object of management for the fatigue management system S, is not particularly limited, and examples include a hydraulic excavator 10. For instance, the hydraulic excavator 10 is a very large hydraulic excavator used in mines. Hereinafter, first, an example of the configuration of the hydraulic excavator 10, an object of management for the fatigue management system S of the present embodiment, will be described. And then, the configuration of each section of the fatigue management system S of the present embodiment will be described in detail.

[Hydraulic Excavator]

In one example, as shown in FIG. 3, the hydraulic excavator 10 includes a lower traveling body 11, an upper slewing body 12, a cab 13, a front working machine 14, and a controller 15. The hydraulic excavator 10 also includes the sensor 18, a transmitter 19A, and a monitor 19B shown in FIG. 2, and an operating lever 13a and a hydraulic driver 17 shown in FIG. 4. The following may describe each part of the hydraulic excavator 10 with reference to a three-dimensional orthogonal coordinate system having X-axis parallel to the front-rear direction of the hydraulic excavator 10, Y axis parallel to the width direction of the hydraulic excavator 10, and Z axis parallel to the height direction of the hydraulic excavator 10.

In one example, the lower traveling body 11 has a traveling device 11a with a pair of crawlers in the width direction (Y direction) of the hydraulic excavator 10. In one example, the lower traveling body 11 driven by the hydraulic driver 17 causes traveling of the hydraulic excavator 10.

The upper slewing body 12 is mounted on the lower traveling body 11 to be able to swivel. In one example, the upper slewing body 12 is driven by a hydraulic motor or an electric motor, which are not shown, and swivels relative to the lower traveling body 11 around a rotary shaft parallel to the height direction (Z direction) of the hydraulic excavator 10. In one example, the upper slewing body 12 houses various devices such as an engine (not shown), a hydraulic pump described later, and a plurality of valves.

In one example, the cab 13 is a cabin of the hydraulic excavator 10, in which a seat for an operator who manipulates the hydraulic excavator 10 is housed. In one example, the cab 13 is placed above the front portion of the upper slewing body 12 to be adjacent to the front working machine 14.

In one example, the front working machine 14 is provided on the front side of the upper slewing body 12 and driven by the hydraulic driver 17 and performs works such as digging. In one example, the front working machine 14 has a boom 14a, an arm 14b, and a bucket 14c.

In one example, the boom 14a has a proximal end that connects to the upper slewing body 12 via a rotary shaft parallel to the width direction (Y direction) of the hydraulic excavator 10. In one example, the boom 14a is driven by an actuator and rotates in a predetermined angular range around the rotary shaft mounted to the upper slewing body 12. In one example, a hydraulic cylinder 1 is used as the actuator to drive the boom 14a. The hydraulic cylinder 1 is a hydraulic actuator driven by hydraulic oil supplied.

In one example, the hydraulic cylinder 1 has a cylinder tube 1a, a piston 1b, and a rod 1c. In one example, the hydraulic cylinder 1 is a single-rod hydraulic cylinder having the rod 1c protruding to one side of the cylinder tube 1a. The hydraulic cylinder 1 that drives the boom 14a may be referred to as a boom cylinder 1A, for example.

In the boom cylinder 1A, one end of the cylinder tube 1a is connected to an intermediate portion of the boom 14a via a rotary shaft parallel to the width direction (Y direction) of the hydraulic excavator 10. The piston 1b is housed in the cylinder tube 1a and slides in the axial direction of the rod 1c along the inner peripheral face of the cylinder tube 1a. One end of the rod 1c is connected to the piston 1b inside the cylinder tube 1a. In the boom cylinder 1A, the other end of the rod 1c extends externally from the inside of the cylinder tube 1A and is connected to the upper slewing body 12 via a rotary shaft parallel to the width direction (Y direction) of the hydraulic excavator 10.

In one example, the arm 14b has a proximal end that connects to the distal end of the boom 14a via a rotary shaft parallel to the width direction (Y direction) of the hydraulic excavator 10. In one example, the arm 14b is driven by an actuator and rotates in a predetermined angular range around the rotary shaft mounted to the boom 14a. In one example, similarly to the boom cylinder 1A, a hydraulic cylinder 1 is used as the actuator to drive the arm 14b. The hydraulic cylinder 1 driving the arm 14b may be referred to as an arm cylinder 1B, for example.

In the arm cylinder 1B, one end of the cylinder tube 1a is connected to an intermediate portion of the boom 14a via a rotary shaft parallel to the width direction (Y direction) of the hydraulic excavator 10. In the arm cylinder 1B, the other end of the rod 1c, which is on the other side of the end connecting to the piston 1b, is connected to the proximal end of the arm 14b via a rotary shaft parallel to the width direction (Y direction) of the hydraulic excavator 10. In one example, the rod 1c of the arm cylinder 1B is connected to the proximal end side of the arm 14b than the distal end of the boom 14a.

In one example, the bucket 14c has a proximal end that connects to the distal end of the arm 14b via a rotary shaft parallel to the width direction (Y direction) of the hydraulic excavator 10. In one example, the bucket 14c is driven by an actuator and rotates in a predetermined angular range around the rotary shaft mounted to the arm 14b. In one example, a hydraulic cylinder 1 similar to the boom cylinder 1A is used as the actuator to drive the bucket 14c. The hydraulic cylinder 1 that drives the bucket 14c may be referred to as a bucket cylinder 1C, for example.

In the bucket cylinder 1C, one end of the cylinder tube 1a is connected to the proximal end of the arm 14b, for example, via a rotary shaft parallel to the width direction (Y direction) of the hydraulic excavator 10. In the bucket cylinder 1C, the other end of the rod 1c, which is on the other side of the end connecting to the piston 1b, is connected to the proximal end of the bucket 14c via a link, for example. In one example, the link is connected to the rod 1c via a rotary shaft parallel to the width direction (Y direction) of the hydraulic excavator 10.

In one example, the controller 15 is housed in the upper slewing body 12, and controls the hydraulic driver 17 based on the pilot pressure in accordance with the operation with the operating lever 13a in the cab 13 and a signal from the sensor 18 mounted to the hydraulic excavator 10. In one example, the controller 15 is a computer unit including a calculation unit 15a such as a central processing unit, a memory 15b such as RAM and ROM, programs stored in the memory 15b, and an input/output unit for inputting/outputting signals.

The calculation unit 15a, the memory 15b, the programs, and the input/output unit of the controller 15 are constituting a stress calculation section S1, a damage degree calculation section S2, and an index value calculation section S3 of the fatigue management system S. The details of these stress calculation section S1, damage degree calculation section S2, and index value calculation section S3 are described below. In this embodiment, the controller 15 controlling the hydraulic driver 17 includes the stress calculation section S1, the damage degree calculation section S2, and the index value calculation section S3 of the fatigue management system S, and these sections may be provided separately from the controller 15. In one example, the controller 15 is connected to the sensor 18, the transmitter 19A, and the monitor 19B via a network such as a control area network (CAN).

In one example, the hydraulic driver 17 includes a hydraulic cylinder 1, a hydraulic pump 2, a pilot pump 3, a bottom-pressure sensor 4a, an operating-pressure sensor 4b, a hydraulic oil tank 5, and an engine 6. The hydraulic driver 17 also includes a directional control valve V1, a variable throttle V2, and a variable throttle control valve V3. In one example, the hydraulic excavator 10 is equipped with three hydraulic cylinders 1: a boom cylinder 1A, an arm cylinder 1B and a bucket cylinder 1C. These cylinders 1 have a similar configuration. FIG. 2 therefore shows one of the hydraulic cylinders 1, and omits the other two hydraulic cylinders 1.

As described above, the hydraulic cylinder 1 has the cylinder tube 1a, the piston 1b, and the rod 1c. The interior of the cylinder tube 1a is divided by the piston 1b into a bottom-side oil chamber 1e located close to the proximal end of the cylinder tube 1a and a rod-side oil chamber if located close to the distal end of the cylinder tube 1a.

In response to supplying of hydraulic oil into the bottom-side oil chamber 1e, the piston 1b of the hydraulic cylinder 1 moves to the distal end of the cylinder tube 1a. Then the hydraulic oil is discharged from the rod-side oil chamber 1f, so that the rod 1c extends. In response to supplying of hydraulic oil into the rod-side oil chamber 1f, the piston 1b of the hydraulic cylinder 1 moves to the proximal end of the cylinder tube 1a. Then the hydraulic oil is discharged from the bottom-side oil chamber 1e, so that the rod 1c contracts.

Specifically, extension of the rod 1c of the boom cylinder 1A rotates the boom 14a around the rotary shaft at the proximal end of the boom 14a, and moves the distal end of the boom 14a upward in the height direction (Z direction) of the hydraulic excavator 10. Contraction of the rod 1c of the boom cylinder 1A rotates the boom 14a around the rotary shaft at the proximal end of the boom 14a, and moves the distal end of the boom 14a downward in the height direction (Z direction) of the hydraulic excavator 10.

Extension of the rod 1c of the arm cylinder 1B rotates the arm 14b around the rotary shaft at the proximal end of the arm 14b, and moves the distal end of the arm 14b downward in the height direction (Z direction) of the hydraulic excavator 10. Contraction of the rod 1c of the arm cylinder 1B rotates the arm 14b around the rotary shaft at the proximal end of the arm 14b, and moves the distal end of the arm 14b upward in the height direction (Z direction) of the hydraulic excavator 10.

Extension of the rod 1c of the bucket cylinder 1C rotates the bucket 14c around the rotary shaft at the proximal end of the bucket 14c, and moves the distal end of the bucket 14c upward in the height direction (Z direction) of the hydraulic excavator 10. Contraction of the rod 1c of the bucket cylinder 1C rotates the arm 14b around the rotary shaft at the proximal end of the bucket 14c, and moves the distal end of the bucket 14c downward in the height direction (Z direction) of the hydraulic excavator 10.

In one example, the hydraulic pump 2 is a variable capacity hydraulic pump of the swash plate type, radial piston type or bent axis type. The hydraulic pump 2 is rotatably driven by the engine 6. In one example, the hydraulic pump 2 has a variable capacity portion 2a including a swash plate, a bent axis, or the like, and variable volume mechanism 2b that drives the variable capacity portion 2a. The variable volume mechanism 2b drives the variable capacity portion 2a based on the instruction of the controller 15. This changes the tilt angle of the variable capacity portion 2a to increase or decrease the pump capacity of the hydraulic pump 2. The hydraulic pump 2 discharges pressure oil into the discharge pipeline. The discharge pipeline branches into a center bypass pipeline and a branch pipeline at a position upstream of the directional control valve V1.

In one example, the pilot pump 3 is a fixed capacity hydraulic pump. The pilot pump 3 is also rotatably driven by the engine 6. The pilot pump 3, together with the hydraulic oil tank 5, constituting a pilot pressure-oil source. The pilot pump 3 discharges pilot pressure oil into the pilot pipeline. The pilot pipeline branches into the throttle pilot pipeline for supplying pilot pressure oil to the variable throttle control valve V3 at a position upstream of the operating lever 13a.

The directional control valve V1 changes the pressure oil to be supplied from the hydraulic pump 2 to the hydraulic cylinder 1 to control the supply and discharge of the pressure oil to the hydraulic cylinder 1. The directional control valve V1 includes a hydraulic pilot type directional control valve with 6 ports and 3 positions. The directional control valve V1 is connected to the hydraulic pump 2 via the discharge pipeline, and is connected to the hydraulic oil tank 5 via the center bypass pipeline and the return pipeline. The directional control valve V1 is also connected to the bottom-side oil chamber 1e of the hydraulic cylinder 1 via the bottom-side pipeline and to the rod-side oil chamber if of the hydraulic cylinder 1 via the rod-side pipeline.

The variable throttle V2 is located downstream of the directional control valve V1 in the middle of the center bypass pipeline. The variable throttle V2 variably throttles the flow area of the center bypass pipeline at a position downstream of the directional control valve V1. The variable throttle V2 is controlled by the pilot pressure oil supplied from the variable throttle control valve V3. The variable throttle V2 has a smaller flow channel area with a larger pilot pressure from the variable throttle control valve V3, and has a larger flow channel area with a smaller pilot pressure. The pilot pressure of the variable throttle control valve V3 is variably controlled by the controller 15.

The bottom pressure sensor 4a detects the pressure of the pressure oil in the bottom-side oil chamber 1e of the hydraulic cylinder 1. In one example, the bottom pressure sensor 4a detects the pressure of the bottom-side oil chamber 1e or the bottom-side pipeline. The bottom pressure sensor 4a is connected to the controller 15 via a signal line, and outputs a detection signal corresponding to the detected pressure of the bottom-side oil chamber 1e to the controller 15.

The operating pressure sensor 4b detects the displacement of the operating lever 13a. In one example, the operating pressure sensor 4b is placed in the lowering-side pilot pipeline. The operating pressure sensor 4b detects the hydraulic pressure in the lowering-side pilot pipeline, that is, the pilot pressure for lowering the boom. The operating pressure sensor 4b is connected to the controller 15 via a signal line and detects the pilot pressure of the boom lowering corresponding to the amount of boom lowering. The operating pressure sensor 4b outputs a detection signal corresponding to the pilot pressure of the boom lowering to the controller 15.

The sensor 18 is attached to a part of the hydraulic excavator 10, and detects physical quantities and outputs them to the controller 15. Specifically, the sensor 18 includes a force sensor that detects a force acting on the hydraulic excavator 10, which is a construction machine, and an attitude sensor that detects the attitude of the hydraulic excavator 10, for example. In the example shown in FIG. 2, the sensor 18 includes a hydraulic sensor 18b as the force sensor, and an angle sensor 18a, an angular rate sensor 18c, an acceleration sensor 18d, an inclination angle sensor 18e, and a not-shown stroke sensor as the attitude sensors. The stroke sensor detects the strokes of the boom cylinder 1A, the arm cylinder 1B, and the bucket cylinder 1C.

In one example, the hydraulic sensor 18b detects the pressure of the hydraulic oil in the bottom-side oil chamber 1e of the hydraulic cylinder 1. Specifically, the hydraulic sensor 18b detects the pressure of the hydraulic oil in the bottom-side oil chamber 1e of each of the boom cylinder 1A, the arm cylinder 1B, and the bucket cylinder 1C. The hydraulic sensor 18b may be the bottom pressure sensor 4a described above, for example. When the lower traveling body 11 and the upper slewing body 12 are driven by a hydraulic motor, the hydraulic sensor 18b detects the pressure of the hydraulic oil of the hydraulic motor.

In one example, the angle sensor 18a detects the angle of various parts of the construction machine. Specifically, the angle sensor 18a detects the angle of the upper slewing body 12 of the hydraulic excavator 10 and of various parts of the front working machine 14, for example. More specifically, this angle sensor 18a is placed at each of the rotary shaft of the upper slewing body 12, the rotary shaft at the proximal end of the boom 14a, the rotary shaft at the proximal end of the arm 14b, and the rotary shaft at the proximal end of the bucket 14c. In one example, the angle sensor 18a detects the rotation angle of the upper slewing body 12 relative to the lower traveling body 11, the rotation angle of the boom 14a relative to the upper slewing body 12, the rotation angle of the arm 14b relative to the boom 14a, and the rotation angle of the bucket 14c relative to the arm 14b. In one example, the angular rate sensor 18c is attached to each of the upper slewing body 12, the boom 14a, the arm 14b, and the bucket 14c, and detects the angular rates of the upper slewing body 12, the boom 14a, the arm 14b and the bucket 14c. In one example, the acceleration sensor 18d is attached to each of the upper slewing body 12, the boom 14a, the arm 14b, and the bucket 14c, and detects the accelerations of the upper slewing body 12, the boom 14a, the arm 14b and the bucket 14c. In one example, the inclination angle sensor 18e is attached to each of the upper slewing body 12, the boom 14a, the arm 14b, and the bucket 14c, and detects the inclination angles of the upper slewing body 12, the boom 14a, the arm 14b and the bucket 14c.

In one example, the transmitter 19A is connected to the controller 15, and transmits a fatigue index value output from the controller 15. Specifically, the transmitter 19A transmits the fatigue index value to the server 140 via a communication satellite 170, a base station 180, and a network 190. The transmitter 19A also transmits the fatigue index value to a client terminal 160A, which is an information terminal 160, by wireless communication, for example. The transmitter 19A may transmit identification information on the hydraulic excavator 10. The hydraulic excavator 10 may be equipped with a positioning device such as a global navigation satellite system (GNSS). In this case, the transmitter 19A may transmit the position information on the hydraulic excavator 10.

In one example, the monitor 19B is a display device such as a liquid crystal display device or an organic EL display device placed in the cab 13. In one example, the monitor 19B may include an input device, such as a touch panel. In one example, the monitor 19B displays an image of a plurality of portions of the components of the hydraulic excavator 10 in association with the fatigue index values output from the controller 15.

With the configuration above, in response to the operation by the operator with the operating lever 13a, the directional control valve V1 of the hydraulic excavator 10 moves by the pressure oil from the pilot pump 3, and the pressure oil of the hydraulic pump 2 is guided to the bottom-side oil chamber 1e or the rod-side oil chamber if of the hydraulic cylinder 1. As a result, the hydraulic excavator 10 expands or contracts the rods 1c of the boom cylinder 1A, the arm cylinder 1B, and the bucket cylinder 1C according to the displacement of the operating lever 13a as described above to operate each part of the boom 14a, the arm 14b, and the bucket 14c.

The controller 15 controls the hydraulic motor or the electric motor between the lower traveling body 11 and the upper slewing body 12 in accordance with the operation signal from the operating lever 13a. As a result, the hydraulic excavator 10 swivels the upper slewing body 12 relative to the lower traveling body 11 in accordance with the displacement of the operating lever 13a.

[Fatigue Management System]

Next, the following describes the structure of various sections of the fatigue management system S of the present embodiment in more details. In one example, the fatigue management system S of the present embodiment includes a server 140, a memory device 150, and an information terminal 160 in addition to the stress calculation section S1, the damage degree calculation section S2, and the index value calculation section S3 as described above.

In one example, the stress calculation section S1, the damage degree calculation section S2, and the index value calculation section S3 constituting the fatigue management system S of the present embodiment can be constituted by the controller 15 mounted in the construction machine, as shown in FIGS. 2 and 3. The stress calculation section S1, the damage degree calculation section S2, and the index value calculation section S3 constituting the fatigue management system S do not necessarily have to be mounted on the construction machine. In another example, the stress calculation section S1, the damage degree calculation section S2, and the index value calculation section S3 can be constituted by the server 140 and the memory device 150 shown in FIG. 1.

As described above, the stress calculation section S1 calculates the stress acting on a plurality of portions of the construction machine based on the output of the sensor 18 attached to a part of the construction machine. Specifically, in one example, the stress calculation section S1 calculates the stress acting on a plurality of portions of each of the boom 14a, the arm 14b, and the bucket 14c of the hydraulic excavator 10 based on the outputs of the sensors 18 attached to the boom 14a, the arm 14b, and the bucket 14c. Although not particularly limited, tens to hundreds of portions may be set for each component.

An example of the stress calculation method by the stress calculation section S1 is as follows. As shown in FIG. 2, the stress calculation section S1 calculates the stress acting on a plurality of portions of each component constituting the hydraulic excavator 10 using a stress calculation expression stored in advance in the memory 15b, for example. The stress calculation expression, for example, represents the relationship between the outputs of the sensor 18 and the stress acting on a plurality of portions of the components of the hydraulic excavator 10. The stress calculation expression is obtained in advance for each portion of the components of the hydraulic excavator 10 using a multiple regression equation or a regression equation using machine learning, and is stored in the memory 15b.

An example of the stress calculation equations is shown in the following expressions (1) to (3). In expressions (1) to (3), $\sigma_1$, $\sigma_2$, . . . denote stresses acting on a plurality of portions of the components of the hydraulic excavator 10. In expressions (1) to (3), $s_1$, $s_2$, . . . denote the outputs of the sensors 18, M, N and A are constants based on the characteristics of these portions, and t denotes the time. Thus, the stress calculation equations may be obtained in advance, whereby the stress acting on each of many portions of the components of the hydraulic excavator 10 and the time-history stress waveforms can be easily obtained by simple calculations based on the output of the sensor 18.

[Mathematical 1]

$$\begin{bmatrix} \sigma_1 \\ \sigma_2 \\ \vdots \end{bmatrix} = M \begin{bmatrix} s_1 \\ s_2 \\ \vdots \end{bmatrix} + A \quad (1)$$

[Mathematical 2]

$$\begin{bmatrix} \sigma_1 \\ \sigma_2 \\ \vdots \end{bmatrix} = M_1 \begin{bmatrix} s_1 \\ s_2 \\ \vdots \end{bmatrix} + M_2 \begin{bmatrix} s_1^2 \\ s_2^2 \\ \vdots \end{bmatrix} + M_3 \begin{bmatrix} s_1^2 \\ s_2^2 \\ \vdots \end{bmatrix} + \cdots + A \quad (2)$$

[Mathematical 3]

$$\begin{bmatrix} \sigma_{1t} \\ \sigma_{2t} \\ \vdots \end{bmatrix} = M_t \begin{bmatrix} s_{1t} \\ s_{2t} \\ \vdots \end{bmatrix} + \sum_{i=1}^{t-1} N_i \begin{bmatrix} \sigma_{1i} \\ \sigma_{2i} \\ \vdots \end{bmatrix} + \sum_{i=1}^{t-1} M_1 \begin{bmatrix} s_{1t} \\ s_{2t} \\ \vdots \end{bmatrix} \quad (3)$$

In one example, the stress calculation section S1 may calculate the stress at each portion of the hydraulic excavator 10 having the posture reproduced by the acceleration sensor 18d or a gyroscope sensor and the angle sensor 18a shown in FIG. 2 based on the following expression (4).

[Mathematical 4]

$$[M]\{\ddot{u}\}+[C]\{\dot{u}\}+[K]\{u\}=\{F\} \quad (4)$$

In the above expression (4), [M] denotes a mass matrix, [C] denotes a damping matrix, [K] denotes a stiffness matrix, and {u} denotes a displacement matrix. In this expression, {F} denotes an external force acting on the structure, such as the pressure of the hydraulic cylinder 1, the swiveling pressure of the upper slewing body 12, and the hydraulic motor pressure of the lower traveling body 11.

The damage degree calculation section S2 calculates the cumulative damage degree D at each portion based on the stress acting on the portion calculated by the stress calculation section S1. Specifically, the damage degree calculation section S2 calculates the cumulative damage degree D at each portion of the components based on the time history stress waveform acting on the portion of the components of the hydraulic excavator 10 and the S-N curve of the stress amplitude and the number of repetitions. In one example, the cumulative damage degree D can be calculated by Miner's rule shown in expression (5) below or the modified Miner's rule, following the frequency analysis of the time history stress waveform by the range-pair counting, the peak valley method, or the rainflow counting.

[Mathematical 5]

$$D = \sum_i \frac{n_i}{N_i} \quad (5)$$

The index value calculation section S3 calculates a fatigue index value, which is a weighted value of the cumulative damage degree D calculated by the damage degree calculation section S2, for each portion of the components of the hydraulic excavator 10. In one example, the fatigue index value is obtained by assigning the weighting according to the usage environment, material properties, and other factors for each component and each portion of the hydraulic excavators 10 to the cumulative damage degree calculated for each portion of the components of the hydraulic excavator 10. The fatigue index value indicates the degree of fatigue and is represented by an integer increasing from 1, for example.

FIGS. 5A to 5D show an example of obtaining a fatigue index value from a cumulative damage degree D at each portion of the components of the hydraulic excavator 10. In this example, a plurality of maps (A) to (D) are set, having different weighting conditions according to the magnitude of the cumulative damage degree D. The fatigue index value i is then obtained based on the cumulative damage degree D from the selected one of the maps (A) to (D). (A) to (D) shows examples of the maps for the fatigue index values i. In these drawings, the range of the cumulative damage degree D from 0.0 and less than 0.35 is the low range, the range from 0.35 and less than 0.65 is the medium range, and the range above 0.65 is the high range. The fatigue index value i in this case is represented with a corresponding predetermined level, where Lv.1<Lv.2<Lv.3<Lv.4<Lv.5. In the map (A) of FIG. 5A, when the cumulative damage degree D is in the low range, the fatigue index value does not change with an increase in the cumulative damage degree D. In this case, the fatigue index value has a constant Lv.1 value. When the cumulative damage degree D is in the middle range, the fatigue index value increases as in Lv.2, Lv.3, and Lv.4 with an increase in the cumulative damage degree D. When the cumulative damage degree D is in the high range, the fatigue index value does not change with an increase in the cumulative damage degree D, and has a constant Lv.5. In the map (B) of FIG. 5B, when the cumulative damage degree D is in the low range, the fatigue index value i increases as in Lv.1, Lv.2, and Lv.3 with an increase in the cumulative damage degree D. When the cumulative damage degree D is in the middle range, the fatigue index value i does not change with an increase in the cumulative damage degree D, and has a constant Lv.4. When the cumulative damage degree D is in the high range, the fatigue index value does not change with an increase in the cumulative damage degree D, and has a constant Lv.5. In the map (C) of FIG. 5C, when the cumulative damage degree D is in the low range and in the middle range, the fatigue index value does not change with an increase in the cumulative damage degree D, and has a constant Lv.1 value. When the cumulative damage degree D is in the high range, the fatigue index value i increases as in Lv.2, Lv.3, Lv.4, and Lv.5 with an increase in the cumulative damage degree D. In the map (D) of FIG. 5D, when the cumulative damage degree D is from the low range to the high range, the fatigue index value i increases as in Lv.1, Lv.2, Lv.3, Lv.4, and Lv.5 with an increase of the cumulative damage degree D by 0.2 to 0.25. The maps (A) and (B) are examples of increasing the fatigue index value at a relatively early stage, and the maps (C) and (D) are examples of increasing the fatigue index value according to the increase of the cumulative damage degree D. As described above, the memory 15b stores conditions to select a map for each portion of the components of the hydraulic excavator 10 as an operating machine from the maps (A) to (D) having different weightings, for example.

The index value calculation section S3 selects one of the maps (A), (B), (C) and (D) according to the conditions stored in the memory 15b for each portion of the components of the hydraulic excavator 10. The index value calculation section S3 then sets the fatigue index value i at Lv.1 to Lv.5 from the selected map, based on the cumulative damage degree D calculated by the damage degree calculation section S2 to calculate the fatigue index value i for each portion of the components of the hydraulic excavator 10. The following describes some examples of the conditions stored in this memory 15b and the selection of map (A), (B), (C) or (D) based on the conditions.

In the first example of map selection, the condition contains the coincident degree between the stress acting on each portion of the components obtained by calculation from the detection results of the sensor 18 and the stress actually acting on each portion of the components. The map is then selected based on this condition for each portion of the components from the maps (A), (B), (C) and (D). For the coincident degree between the stress obtained by the calculation and the actual stress, the data may be empirically obtained from the work history of the operating machine such as the hydraulic excavator 10. Or a stress sensor such as a strain gauge may be attached to each portion of the components of the operating machine, and a comparison may be made between the actual stress experimentally obtained in advance and the stress obtained from the calculation as stated above. In the latter case, the coincident degree between the calculated stress and the actual stress can be obtained based on the coefficient of determination $R^2$, for example. In one example, the conditions for the coincident degree may be classified into several conditions based on the coefficients of determination $R^2$, where it has the highest accuracy when the coefficient of determination $R^2$ is 0.8 or more, which is a threshold, and predetermined thresholds are set for the coefficients of determination $R^2$ less than 0.8 to classify them into several conditions of high accuracy, medium accuracy and low accuracy.

The memory 15b stores a condition for selecting one of the maps (A), (B), (C) and (D) having different weightings for each portion of the components of the operating machine. To this end, the memory 15b stores the condition for the coincident degree between the actual stress acting on each portion of the hydraulic excavator 10 and the stress calculated by the stress calculation section S1, for example. Specifically, the memory 15b stores one of the four conditions of low accuracy, medium accuracy, high accuracy, and highest accuracy as a condition of the coincident degree for each evaluation point, for example. The memory 15b also stores thresholds for the coincident degree, the first maps (C) and (D) that increase the fatigue index value i with an increase in the cumulative damage degree D, and the second maps (A) and (B) that increase the fatigue index value i earlier than the first maps (C) and (D) with an increase in the cumulative damage degree D. In one example, the index value calculation section S3, which calculates the fatigue index value i for each portion of the components of the operating machine such as the hydraulic excavator 10, refers to the conditions for the coincident degree between the stresses calculated and the actual stresses for the portion that is stored in the memory 15b. The index value calculation section S3 then determines which of the four conditions of low accuracy, medium accuracy, high accuracy, and highest accuracy is the coincident degree for the portion. Note here that the conditions for coincident degree may be classified into two conditions including low accuracy and high accuracy, three conditions including low accuracy, medium accuracy and high accuracy, or five or more conditions.

The index value calculation section S3 selects one of the maps (A), (B), (C), and (D) shown in FIGS. 5A to 5D, for example, for the weighting of the cumulative damage degree of each portion of the components of the operating machine, according to the determined condition for coincident degree. Specifically, the index value calculation section S3 selects the first map (C) or (D) for the portion of the operating machine having the coincident degree that is equal to or higher than the threshold, and selects the second map (A) or (B) for the portion having the coincident degree that is lower than the threshold. More specifically, when the coincident degree is classified into the four conditions as described above, the index value calculation section S3 selects the map (B) shown in FIG. 5B for the portion, which is selected for calculation of the fatigue index value, corresponding to low accuracy that is the condition of agreement degree, for example. This means that the fatigue index value i of this portion starts to increase from the stage where the cumulative damage degree D is comparatively low. When the coincident degree for the portion selected is medium accuracy, then the index value calculation section S3 selects the map (A) shown in FIG. 5A. When that is high accuracy, the index value calculation section S3 selects the map (D) shown in FIG. 5D, and when that is higher accuracy, i.e., highest accuracy, the index value calculation section S3 selects the map (C) shown in FIG. 5C. In this way, the fatigue index value i for a portion, which increases with the cumulative damage degree, increases more gradually with an increase in the coincident degree.

Figure 5A:
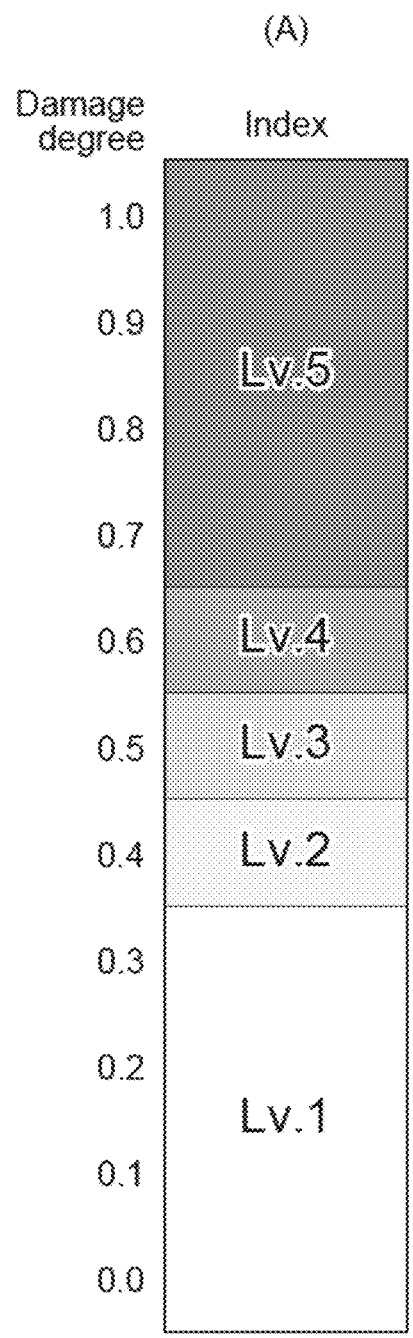
FIG. 5A shows an example of the relationship between the cumulative damage degree of a portion of the operating machine and the fatigue index value.
Figure 5B:
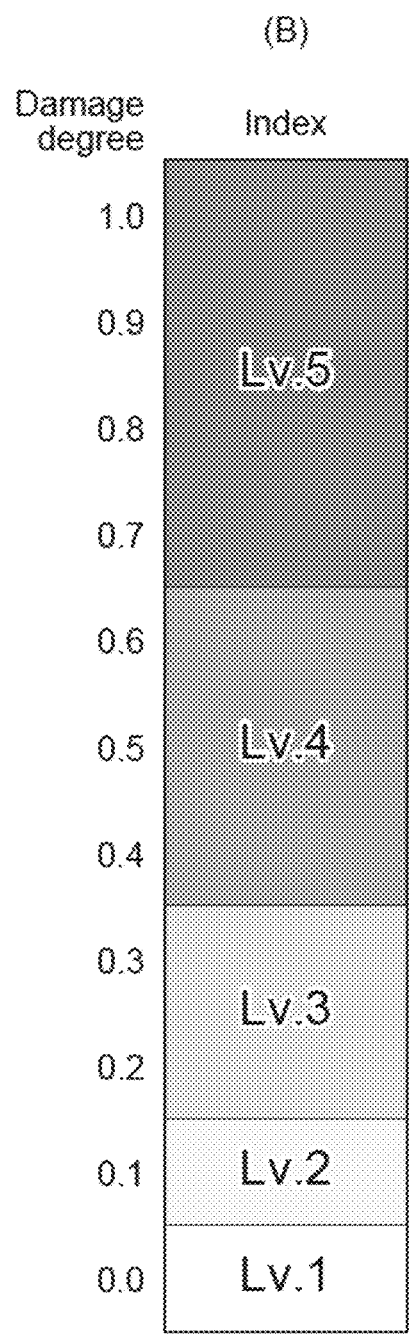
FIG. 5B shows an example of the relationship between the cumulative damage degree of a portion of the operating machine and the fatigue index value.
Figure 5C:
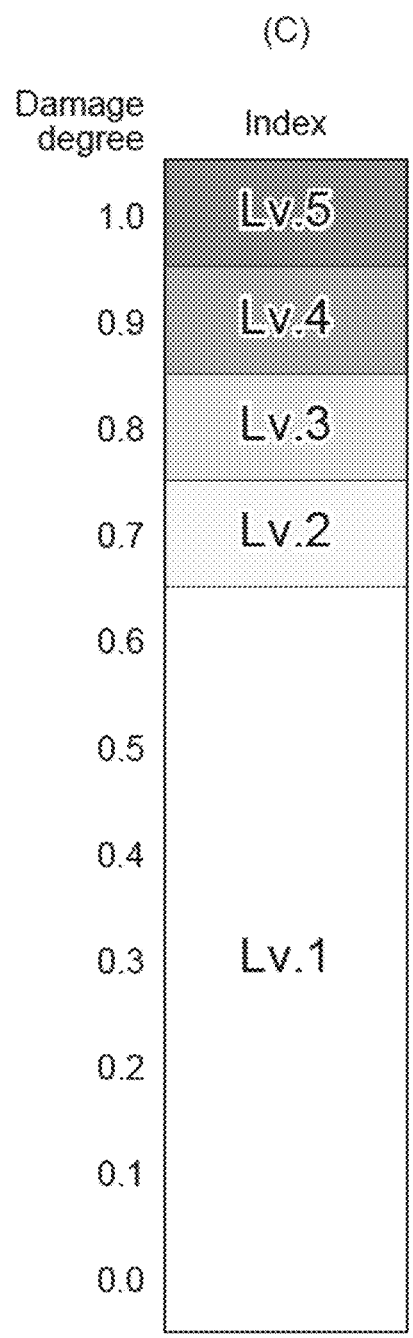
FIG. 5C shows an example of the relationship between the cumulative damage degree of a portion of the operating machine and the fatigue index value.

That is, when the coincident degree between the calculated stress and the actual stress of the selected portion is of the highest accuracy, the index value calculation section S3 increases the fatigue index value i rapidly after the cumulative damage degree D increases and the risk of damage increases as shown in the map (C) in FIG. 5C. When the coincident degree between the calculated stress and the actual stress of the selected portion is of high accuracy, the index value calculation section S3 gradually increases the fatigue index value i with an increase in the cumulative damage degree D as shown in in the map (D) in FIG. 5D, and thus increases the fatigue index value i earlier than the above-stated case of a higher coincident degree. When the coincident degree between the calculated stress and the actual stress of the selected portion is of medium accuracy, the index value calculation section S3 increases the fatigue index value i earlier than the above-stated case of a high coincident degree after the risk increases to a certain extent due to the increase of the cumulative damage degree D as shown in the map (A) of FIG. 5A. When the coincident degree between the calculated stress and the actual stress of the selected portion is of low accuracy, the index value calculation section S3 increases the fatigue index value i earlier than the above-stated case of the coincident degree of medium accuracy as shown in the map (B) in FIG. 5B, to call attention.

In the second example of map selection, the maps (A), (B), (C), and (D) are selected according to the risk of breakage. Specifically, the memory 15b stores a condition for selecting one of the maps (A), (B), (C) and (D) having different weightings for each portion of the components of the operating machine. To this end, the memory 15b stores the conditions for the risk generating breakages for each portion that are classified into three conditions including highest risk, high risk, and others. In one example, the index value calculation section S3, which calculates the index value for each portion of the components of the operating machine such as the hydraulic excavator 10, refers to the conditions for the risk of each portion that are stored in the memory 15b and determines which one of the highest risk, the high risk, and others is the breakage risk of the portion. Note here that the conditions of breakage risk may include two conditions of high risk and others, or four or more conditions.

The index value calculation section S3 selects one of the maps (A), (B), (C), and (D) shown in FIGS. 5A to 5D, for example, for the weighting of the cumulative damage degree D of each portion of the components of the operating machine, according to the determined condition of breakage risk. Specifically, when the breakage risk is classified into the three conditions as described above, the index value calculation section S3 selects the map (B) shown in FIG. 5B for the portion having the highest risk of damage, which is selected for calculation of the fatigue index value i, for example. This means that the fatigue index value i of this portion starts to increase from the stage where the cumulative damage degree D is comparatively low. In one example, when the breakage risk of the selected portion is high risk, then the index value calculation section S3 selects the map (A) shown in FIG. 5A. When the breakage risk is others, the index value calculation section S3 selects the map (C) or (D) shown in FIG. 5C or 5D. In this way, the fatigue index value i for a portion, which increases with the cumulative damage degree D, increases earlier with an increase in the breakage risk.

In the third example of map selection, the maps (A), (B), (C), and (D) are selected according to the degree of influence on the operating machine when the portions are damaged. Specifically, the memory 15b stores a condition for selecting one of the maps (A), (B), (C) and (D) having different weightings for each portion of the components of the operating machine. To this end, the memory 15b stores the conditions for the degree of influence from the portion on the operating machine that are classified into three conditions, including large influence that stops the operation of the operating machine, medium influence that may lead to a concern of stopping the operating machine, and others, for example. In one example, the index value calculation section S3, which calculates the fatigue index value i for each portion of the components of the operating machine such as the hydraulic excavator 10, refers to the conditions for the degree of influence from the portion on the operating machine that are stored in the memory 15b and determines which one of the large influence, the medium influence and others is the degree of influence that the portion has. Note here that the conditions of the influence degree may include two conditions of large influence and others, or four or more conditions.

The index value calculation section S3 selects one of the maps (A), (B), (C), and (D) shown in FIGS. 5A to 5D, for example, for the weighting of the cumulative damage degree D of each portion of the components of the operating machine, according to the determined degree of influence. Specifically, when the degree of influence is classified into the three conditions as described above, the index value calculation section S3 selects the map (B) shown in FIG. 5B for the portion, which is selected for calculation of the fatigue index value i, having a large degree of influence. This means that the fatigue index value of this portion starts to increase from the stage where the cumulative damage degree is comparatively low. When the degree of influence of the selected portion is medium, then the index value calculation section S3 selects the map (A) shown in FIG. 5A.

Figure 5D:
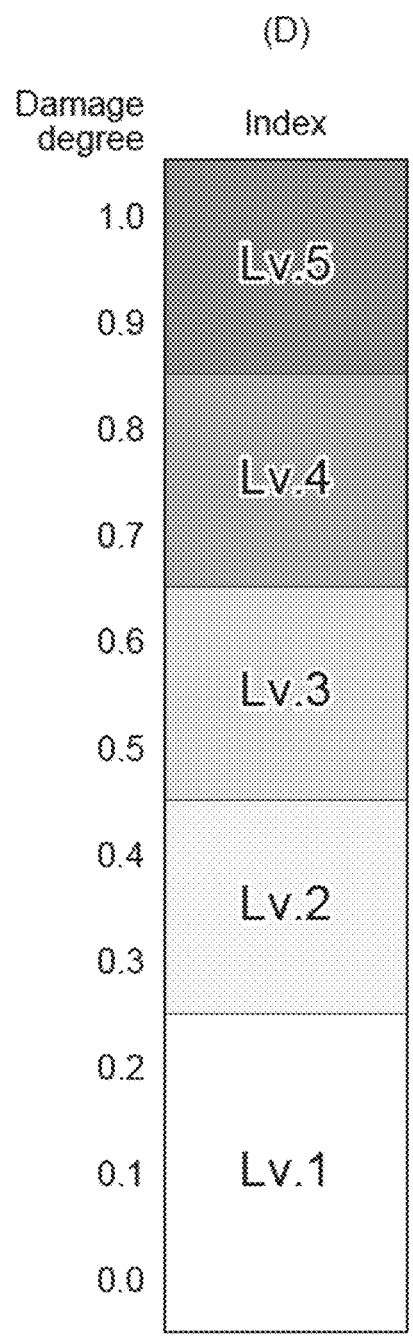
FIG. 5D shows an example of the relationship between the cumulative damage degree of a portion of the operating machine and the fatigue index value.

When the degree of influence is others, the index value calculation section S3 selects the map (C) or (D) shown in FIG. 5C or 5D. In this way, the fatigue index value i for a portion, which increases with the cumulative damage degree, increases earlier with an increase in the degree of influence that the damage of the portion has.

In the fourth example of map selection, the maps (A), (B), (C), and (D) are selected according to the degree of influence on the safety of the operating machine when the portions are damaged. Specifically, the memory 15*b* stores a condition for selecting one of the maps (A), (B), (C) and (D) having different weightings for each portion of the components of the operating machine. To this end, the memory 15*b* stores the conditions for the influence that the portion has on the safety of the operating machine. The conditions are classified into two conditions whether the portion is a safety related component or not or is a safety related portion or not. In one example, the index value calculation section S3, which calculates the index value for each portion of the components of the operating machine such as the hydraulic excavator 10, refers to the conditions for the influence on the safety of the operating machine that are stored in the memory 15*b* and determines whether the portion is a safety related component, a safety related portion or not.

The index value calculation section S3 selects one of the maps (A), (B), (C), and (D) shown in FIGS. 5A to 5D, for example, for the weighting of the cumulative damage degree D of each portion of the components of the operating machine, according to the determined condition. Specifically, when the portion selected for calculation of the fatigue index value i is a safety related component or a safety related portion, the index value calculation section S3 selects the map (A) or (B) shown in FIG. 5A or 5B for the portion. In other case, the index value calculation section S3 selects the map (C) or (D) shown in FIG. 5C or 5D. In this way, when the portion is a safety-related component or safety-related portion, the fatigue index value i of the portion increases earlier than in the other case.

In the fifth example of map selection, the maps (A), (B), (C), and (D) are selected according to the replacement time or repair time of the components including the portions. Specifically, the memory 15*b* stores a condition for selecting one of the maps (A), (B), (C) and (D) having different weightings for each portion of the components of the operating machine. To this end, the memory 15*b* stores the conditions for the replacement/repair difficulty for each portion that are classified into three conditions including: high difficulty requiring a long time for the replacement and repair and also requiring a work vehicle; medium difficulty requiring a time for replacement and repair but not requiring a work vehicle; and low difficulty for others, for example. In one example, the index value calculation section S3, which calculates the fatigue index value i for each portion of the components of the operating machine such as the hydraulic excavator 10, refers to the replacement/repair difficulty of the portion that is stored in the memory 15*b* and determines the replacement/repair difficulty of the component including the portion. Note here that the classification of the replacement/repair difficulty may include two levels of high difficulty and others, or four or more levels.

The index value calculation section S3 selects one of the maps (A), (B), (C), and (D) shown in FIGS. 5A to 5D, for example, for the weighting of the cumulative damage degree of each portion of the components of the operating machine, according to the condition of the determined replacement/repair difficulty. Specifically, when the replacement/repair difficulty is classified into the three conditions as described above, the index value calculation section S3 selects the map (B) shown in FIG. 5B for the portion, which is selected for calculation of the fatigue index value, having high difficulty of replacement/repair. This means that the fatigue index value i of this portion starts to increase from the stage where the cumulative damage degree is comparatively low. When the replacement/repair difficulty of the selected portion is medium, then the index value calculation section S3 selects the map (A) shown in FIG. 5A. When that is others, the index value calculation section S3 selects the map (C) or (D) shown in FIG. 5C or 5D. In this way, the fatigue index value for a portion, which increases with the cumulative damage degree D, increases earlier with an increase in the replacement/repair difficulty.

In another example of map selection, the maps (A), (B), (C) or (D) in FIGS. 5A to 5D may be selected according to the conditions such as the accessibility to a work site such as a mine, the psychological impact on the user, and other conditions such as the use of the vehicle body and the impact of excavated material.

The server 140 performs data communication with a plurality of construction machines. In one example, the server 140 performs data communication with a plurality of hydraulic excavators 10 via a communication satellite 170, a base station 180, a network 190, and the like. In one example, the network 190 is a communication line including the internet connection. In one example, the server 140 performs data communication with the plurality of hydraulic excavators 10 via the client terminals 160A, which are information terminals 160, and the network 190.

In one example, the memory device 150 is connected to the server 140 via the line. In one example, the memory device 150 includes an index value database 150A and a client information database 150B. In one example, the index value database 150A stores the fatigue index values of each of the plurality of construction machines. In one example, the client information database 150B stores various information about a plurality of clients. As described above, the memory device 150 may also store conditions for selecting one of the plurality of maps (A) to (D) shown in FIGS. 5A to 5D for each portion of the components of the hydraulic excavator 10 that is an operating machine.

The information terminals 160 perform data communication with the server 140. In one example, the information terminals 160 include a client terminal 160A and an information terminal 160B that service personnel, clients, sellers, and the like use. In one example, the client terminal 160A is placed at a site where the hydraulic excavator 10 is used, performs data communication with the plurality of hydraulic excavators 10 by wireless communication, and performs data communication with the server 140 via the network 190 by wireless or wired communication. In one example, the information terminal 160B is a desktop computer, a laptop computer, or a mobile information terminal that service personnel, clients, and sellers use, and performs data communication with the server 140 by wired or wireless communication.

In one example, the fatigue management system S of the present embodiment includes an image generator that generates an image of various portions of a construction machine in association with their fatigue index values, and an image display that displays the image. In one example, the image generator may be part of the index value calculation section S3. That is, the index value calculation section S3 also functions as the image generator that generates an image associating various portions of the components of the hydraulic excavator 10 with their fatigue index values. In this case, the monitor 19B can be used as the image display. The information terminal 160 may include the image generator and the image display, or the server 140 may include the image generator and the information terminal 160 may include the image display.

As described above, the fatigue management system S of the present embodiment has the server 140 that performs data communication with a plurality of construction machines, the memory device 150 connected to the server 140, and the information terminals 160 that perform data communication with the server 140. In this case, the information terminals 160 each may have a comparison section that compares the degrees of fatigue based on the time series data of the fatigue index values.

Figure 6A:
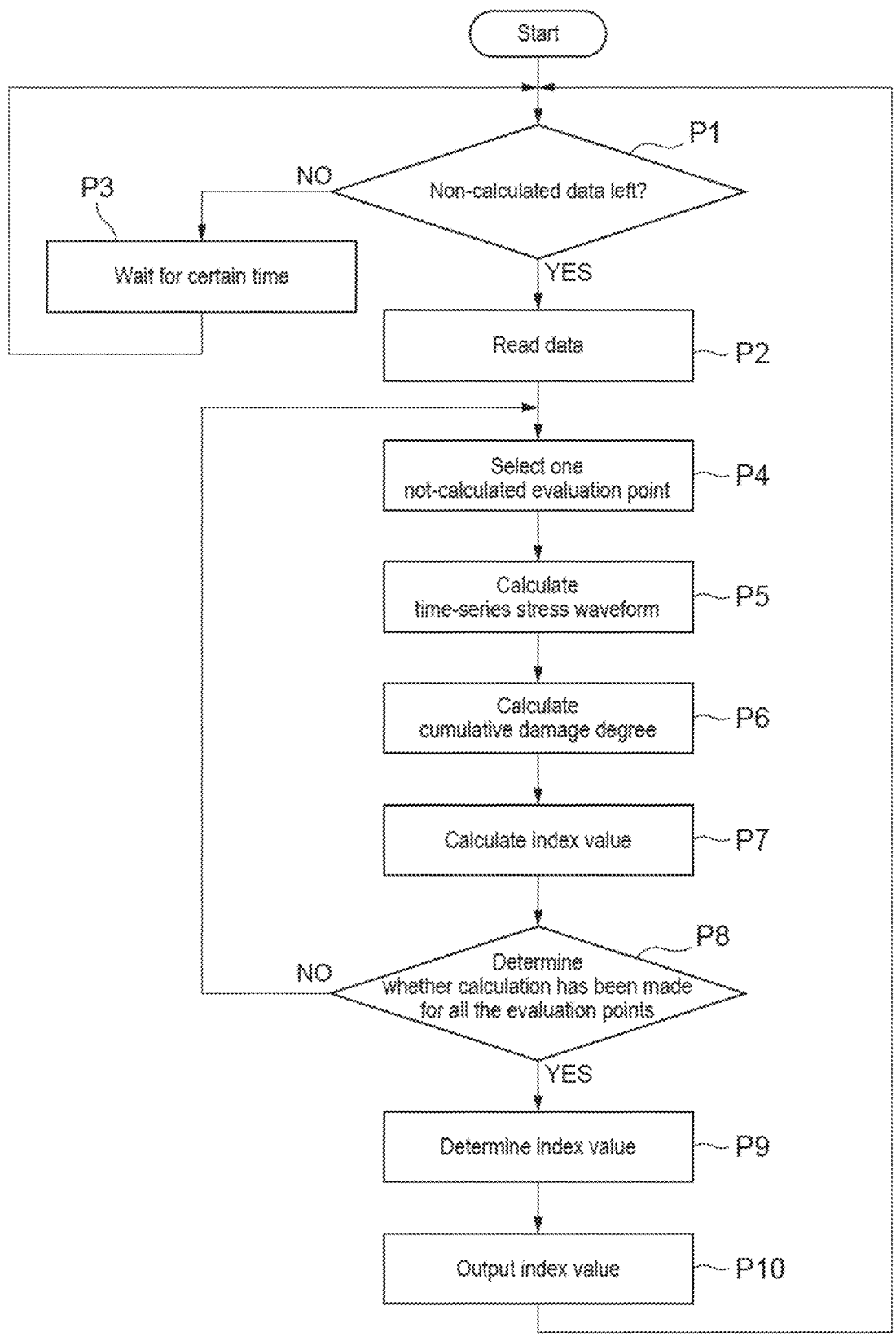
FIG. 6A is a flowchart showing an example of the fatigue index values calculation by the fatigue management system shown in FIG. 2.

Referring to FIGS. 6A to 9, the following describes the action of the fatigue management system S of the present embodiment. FIG. 6A is a flowchart showing an example of the flow of calculating the fatigue index values by the fatigue management system S shown in FIG. 2.

In one example, in response to activation of the hydraulic excavator 10 by the operator, the fatigue management system S starts calculating the fatigue index value i. First, the stress calculation section S1 performs a determination process P1 as to whether the data acquired from the sensor 18 includes not-calculated data. Specifically, in the determination process P1, the stress calculation section S1 searches for the data acquired from the sensor 18. If there is new data that has not been processed in the past (YES), the stress calculation section S1 performs the process P2 to read the data. In the determination process P1, if there is no new data that has not been processed in the past (NO), the stress calculation section S1 performs the process P3 that waits for a certain period of time, and then returns to the determination process P1.

Following the process P2 of reading the data, the stress calculation section S1 performs the process P4 of selecting one evaluation point that has not undergone the stress calculation from the plurality of evaluation points corresponding to the plurality of portions of the components of the hydraulic excavator 10. For the process P4, all the evaluation points have individual numbers assigned, and the stress calculation section S1 selects the not-calculated evaluation points in ascending order one by one starting from the evaluation point with the smallest number.

After the process P4 ends, the stress calculation section S1 uses the above-described calculation expressions (1) to (3) and the data acquired from the sensor 18, for example, to perform process P5 that calculates a time-series stress waveform at the selected evaluation point, that is, a time-history stress waveform. After that, the damage degree calculation section S2 performs the process P6 that calculates the cumulative damage degree at the selected evaluation point based on the time-history stress waveform calculated by the stress calculation section S1 as described above. The index value calculation section S3 then performs the process P7 that calculates the fatigue index value i of the selected evaluation point using the cumulative damage degree D calculated by the damage degree calculation section S2 as described above.

Figure 6B:
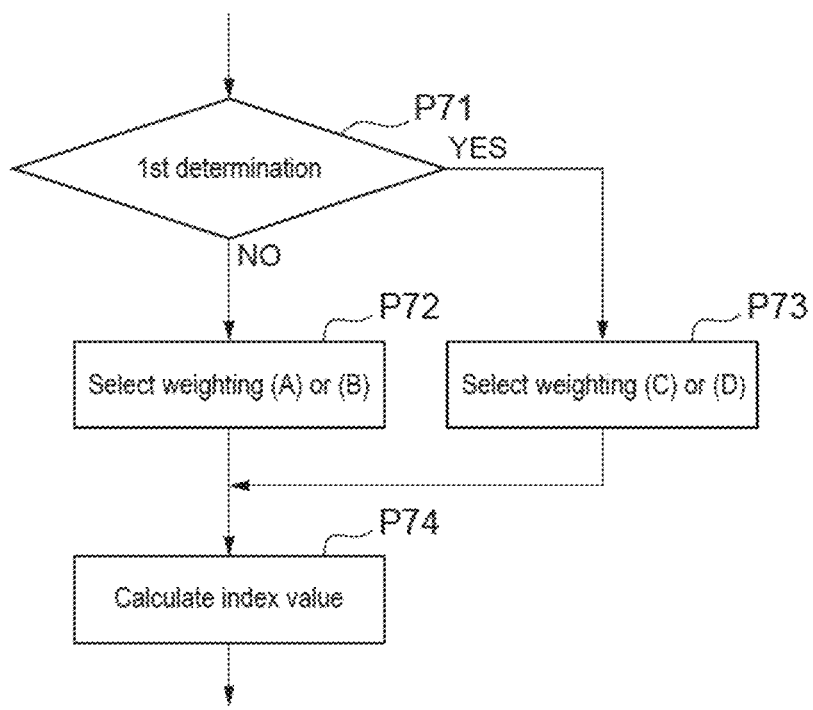
FIG. 6B is a flowchart showing an example of the process of calculating the fatigue index value in FIG. 6A.

FIG. 6B is a flowchart showing an example of the process P7 that calculates the fatigue index value shown in FIG. 6A. As shown in FIG. 6B, the index value calculation section S3 executes a first determination process P71 for the selected evaluation point corresponding to one of the portions of the components of the hydraulic excavator 10 as an operating machine. In this first determination process P71, the index value calculation section S3 determines the condition for the selected evaluation point to select one map (A), (B), (C) or (D) from the plurality of different maps (A) to (D) stored in the memory device 150.

Specifically, assume the case where, as in the first example of map selection described above, the map (A), (B), (C) or (D) is selected for each portion of the hydraulic excavator 10 as an operating machine according to the condition of the coincident degree between the stress acting on the portion, which is obtained by calculation from the detection results of the sensor 18, and the stress actually acting on each portion. In this case, in the first determination process P71, the index value calculation section S3 refers to the condition of the coincident degree for the selected evaluation point stored in the memory device 150 in advance, and determines whether the condition is high accuracy or not.

If the index value calculation section S3 determines in this first determination process P71 that the condition of the coincident degree for the selected evaluation point is not high accuracy (NO), the index value calculation section S3 executes the process P72 to select the second map (A) or (B) shown in FIG. 5A or 5B. If the index value calculation section S3 determines in this first determination process P71 that the condition of the coincident degree for the selected evaluation point is high accuracy (YES), the index value calculation section S3 executes the process P73 to select the first map (C) or (D) shown in FIG. 5C or 5D. After that, in the fatigue index value calculation process P74, the index value calculation section S3 calculates the fatigue index value of the selected evaluation point based on the cumulative damage degree D of the selected map.

Figure 6C:
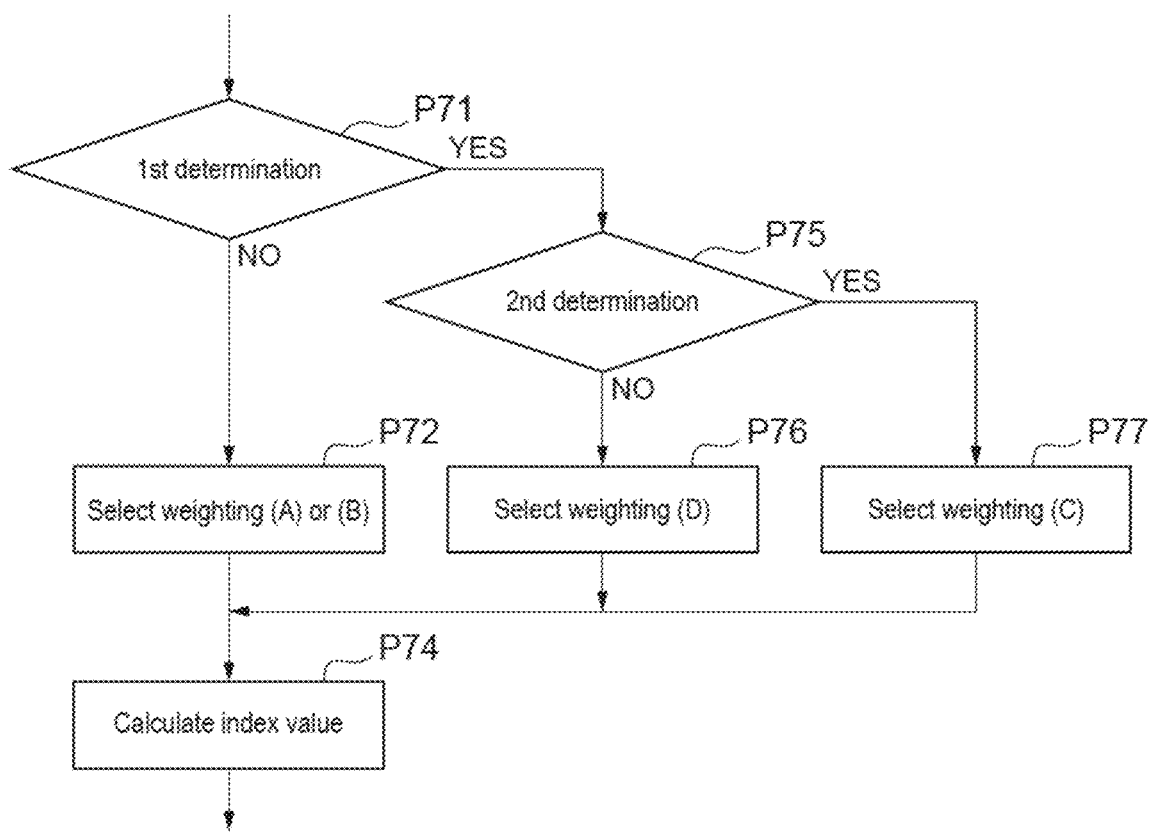
FIG. 6C is a flowchart showing an example of the process of calculating the fatigue index value in FIG. 6A.

FIG. 6C is a flowchart showing another example of the process P7 that calculates the fatigue index value i shown in FIG. 6A. In the example shown in FIG. 6B, the index value calculation section S3 executes the first determination process P71 that classifies the case into two conditions: the coincident degree being high accuracy; and the coincident degree not being high accuracy, according to the condition of the coincident degree between the stress calculated for each evaluation point and the actual stress. In the example shown in FIG. 6C, the index value calculation section S3 executes the first determination process P71 and the second determination process P75 to determine three conditions of the coincident degree between the stress calculated at each evaluation point and the actual stress as described above.

Specifically, in the example of FIG. 6C, the index value calculation section S3 executes the first determination process P71 similarly to the example of FIG. 6B. If it determines that the condition of the coincident degree for the selected evaluation point is not high accuracy or highest accuracy (NO), the index value calculation section S3 executes the process P72 to select the second map (A) or (B) shown in FIG. 5A or 5B. If the index value calculation section S3 determines in this first determination process P71 that the condition of the coincident degree for the selected evaluation point is high accuracy or highest accuracy (YES), the index value calculation section S3 executes the second determination process P75. In the second determination process P75, the index value calculation section S3 determines whether the condition of the coincident degree for the selected evaluation point is highest accuracy or not. If the determination shows that it is not the highest accuracy (NO), the index value calculation section S3 executes the process P76 to select the first map (D) shown in FIG. 5D. If the determination shows that it is the highest accuracy (YES), the index value calculation section S3 executes the process P77 to select the first map (C) shown in FIG. 5C. After that, in the index value calculation process P74, the index value calculation section S3 calculates the fatigue index value i of the selected evaluation point based on the cumulative damage degree D of the selected map.

Although not shown, in addition to the first determination process P71, the process P72 to the process 74, the second determination process P75, and the process 76 and 77, a new condition determination process and a new selection process to select a map based on the determination process may be added. This enables a determination of more than four conditions of the coincident degree between the calculated stress and the actual stress at each evaluation point as described above. In the process P7 of calculating the index value, the index value calculation section S3 may select the map (A), (B), (C), or (D) according to the conditions other than the coincident degree between the stress calculated at each evaluation point and the actual stress using the processing flow as shown in FIGS. 6B and 6C.

Specifically, in the first determination process P71 of the flow shown in FIG. 6B, the index value calculation section S3 may determine whether each portion of the components of the hydraulic excavator 10 as an operating machine has a high risk of damage or not, as in the second example of map selection as described above. Or the index value calculation section S3 may determine whether each portion has a large influence on the safety or not as in the fourth example. As in the third example of map selection as described above, the index value calculation section S3 may determine in the first determination process P71 of the flow shown in FIG. 6C whether or not there is a large influence on the operation of the operating machine, and may determine in the second determination process P75 whether or not there is a small influence on the operation of the operating machine. As in the fifth example of map selection as described above, the index value calculation section S3 may determine whether the replacement/repair difficulty is medium or low in the first determination process P71 of the flow shown in FIG. 6C, and may determine whether the replacement/repair difficulty is low or not in the second determination process P75. In these cases as well, the index value calculation section S3 then executes the process P72, process P73, process 76 or process 77 for selecting the weighting for each evaluation point, and calculates the fatigue index value of the selected evaluation point based on the cumulative damage degree D from the selected map in the fatigue index value calculation process P74.

Next, in the determination process P8 shown in FIG. 6A, the fatigue management system S determines whether or not the stress, the cumulative damage degree, or the fatigue index value has been calculated for all the evaluation points by the stress calculation section S1, the damage degree calculation section S2, or the index value calculation section S3. If the result of the determination process P8 shows that the calculation of all the evaluation points has not been completed (NO), the procedure returns to the process P4. If the result of the determination P8 shows that the calculation of all the evaluation points is completed (YES), the index value calculation section S3 performs a determination process P9 as to whether the fatigue index value exceeds a threshold of each evaluation point stored in the memory 15b, for example.

In this determination process P9, the index value calculation section S3 may compare the fatigue index value of each of the evaluation points with the threshold of the evaluation point, or may compare the fatigue index value of each of a plurality of evaluation points selected in advance with the threshold of the evaluation point. If the result of the determination process P9 shows that the fatigue index value exceeds the threshold at any evaluation point, then the index value calculation section S3 may send an alarm recommending inspection of the portion corresponding to the evaluation point to the information terminal 160 via the transmitter 19A or may display it on the monitor 19B, for example.

After the end of the determination process P9, the index value calculation section S3 performs the process P10 of outputting the fatigue index values of all the evaluation points to the monitor 19B and the memory 15b, and the procedure returns to the determination process P1. In one example, the determination process P1 to the process P10 can be repeated from turning-on of the start switch of the hydraulic excavator 10 to turning-off of the switch.

As described above, the fatigue management system S of this embodiment includes the stress calculation section S1, the damage degree calculation section S2, and the index value calculation section S3. The stress calculation section S1 calculates the stress acting on a plurality of portions of the construction machine based on the output of the sensor 18 attached to a part of the construction machine. The damage degree calculation section S2 calculates the cumulative damage degree of each portion of the construction machine based on the stress calculated by the fatigue management system S. The index value calculation section S3 calculates a fatigue index value, which is a weighted value of the cumulative damage degree, for each portion.

This configuration enables the fatigue management system S to manage the fatigue of each portion of the construction machine more accurately than the conventional systems, according to the conditions specific to each construction machine, each component of the construction machine, and each of a plurality of portions of the components, for example.

Specifically, the cumulative damage degree directly used in the conventional excavator support device is based on the linear cumulative damage rule, which is an empirical rule, and assumes that the object will undergo fatigue fracture when the cumulative damage degree reaches 1. The cumulative damage degree, however, is a value that inherently includes fluctuations, and in reality, an object may undergo fatigue failure before the cumulative damage degree reaches 1, or the object may not undergo fatigue failure even if the cumulative damage degree exceeds 1. The direct use of cumulative damage degree as in the conventional excavator support device therefore may cause insufficient countermeasure for the fatigue at each portion of the excavator or cause waste because of excess countermeasure in reverse.

In contrast, the fatigue management system S of the present embodiment is configured so that the index value calculation section S3 calculates a fatigue index value, which is a weighted value of the cumulative damage degree, for each portion. This configuration enables the management of fatigue at each hydraulic excavator 10 and at the upper slewing body 12, the boom 14a, the arm 14b, the bucket 14c, and a plurality of portions of these components of the hydraulic excavator 10 according to their specific conditions.

Specifically, the weightings may be assigned to the cumulative damage degree so that, among the components of the hydraulic excavator 10, a component having a high risk of damage or a specific portion of such a component has a higher fatigue index value than the fatigue index values of other components or other portions, for example. The fatigue management system uses the fatigue index values calculated by the index value calculation section S3 to enable the fatigue management of the components and specific portions having a high risk of the damage more accurately and safely.

The fatigue management system S of the present embodiment enables setting of the weighting of the cumulative damage degree by the index value calculation section S3 so that the fatigue index value is larger at a site where access is difficult, such as a mine in a remote area, than at a site where access is easy. This makes it possible to request inspections of the construction machine operated at sites where access is difficult at an earlier time than at sites that are easily accessible, thereby enabling highly accurate fatigue management of construction machines according to the site environment.

The fatigue management system S of the present embodiment also enables setting of the weighting of the cumulative damage degree by the index value calculation section S3 so that the fatigue index value is larger for the components that take a longer time to be replaced or repaired or the portions that are more difficult in maintenance than for other components and portions. This enables highly accurate fatigue management of construction machines according to the characteristics of the components of the construction machine and the ease of maintenance of each portion.

In the fatigue management system S of the present embodiment, the sensor 18 includes a force sensor that detects a force acting on the construction machine, and an attitude sensor that detects the attitude of the construction machine. Conventionally such force sensor and attitude sensor have been installed in the construction machine for purposes different from the purpose of calculating stresses acting on various portions of the construction machine. The present embodiment therefore does not require the installment of a sensor such as a strain gauge in the construction machine just for calculating the stress.

The fatigue management system S of this embodiment includes the memory 15b or the memory device 150 that stores conditions for selecting one map (A), (B), (C), or (D) for each portion of the components of the hydraulic excavator 10 from the plurality of different maps (A) to (D). The index value calculation section S3 then selects one of the maps (A), (B), (C) and (D) according to the conditions stored in the memory device 150 for each portion of the components of the hydraulic excavator 10. This configuration enables to differ the way of increasing the fatigue index value with an increase in cumulative damage degree according to the conditions of each portion of the components of the hydraulic excavator 10. Therefore, accurate fatigue management at each component and each portion according to their conditions becomes possible.

In the fatigue management system S of the present embodiment, the memory 15b or the memory device 150 stores a condition for selecting one of the maps (A), (B), (C) and (D) that is the coincident degree between the actual stress acting on each portion of the hydraulic excavator 10 and the stress calculated by the stress calculation section S1. The memory 15b or the memory device 150 also stores the thresholds for coincident degree, the first map (C) or (D) that increases the fatigue index value with an increase in the cumulative damage degree, and the second map (A) or (B) that increases the fatigue index value earlier than the first map (C) or (D) with an increase in the cumulative damage degree. The index value calculation section S3 selects the first map (C) or (D) for the portion of the hydraulic excavator 10 having the coincident degree that is equal to or higher than the threshold, and selects the second map (A) or (B) for the portion having the coincident degree that is lower than the threshold.

With this configuration, the fatigue index value increases relative to the cumulative damage degree more gradually for the portion having the coincident degree that is equal to or greater than the threshold, that is, the portion having more accurately calculated stress by the index value calculation section S3 than for the portion having the coincident degree that is lower than the threshold, that is, the portion not having accurately calculated stress by the index value calculation section S3. In other words, for a portion having the accuracy of the stress calculated by the stress calculation section S1 that is lower than the predetermined threshold, the fatigue index value increases relative to the cumulative damage degree earlier than for other portions. This calls attention for the fatigue at the portion. This configuration therefore manages fatigue of each portion of the hydraulic excavator 10 more accurately than conventional systems, and enhances the safety of the fatigue management system S.

The above describes the example where the fatigue index value is obtained based on the map (A) to (D) that is selected under the above conditions based on the cumulative damage degree D calculated by expression (5). In another example, the fatigue index value can also be obtained by calculation using the following expression (6).

An example of the calculation equation for fatigue index value is shown in the following expression (6). In expression (6), $i_1, i_2, \ldots$ denote fatigue index values of each portion of the components, a denotes an arbitrary coefficient, and $w_{a1}, w_{a2}, \ldots$ and $w_{b1}, w_{b2}, \ldots$ and $b_1, b_2, \ldots$ denote numerical values for weighting specific to each portion of the components of the hydraulic excavator 10. Further, $d_1, d_2, \ldots$ denote the cumulative damage degree of each portion of the components obtained by expression (5).

[Mathematical 6]

$$\begin{bmatrix} i_1 \\ i_2 \\ \vdots \end{bmatrix} = a \begin{bmatrix} w_{a1} & 0 & \cdots \\ 0 & w_{a2} & \cdots \\ \vdots & \vdots & \ddots \end{bmatrix} \begin{bmatrix} w_{b1} & 0 & \cdots \\ 0 & w_{b2} & \cdots \\ \vdots & \vdots & \ddots \end{bmatrix} \cdots \begin{bmatrix} d_1 \\ d_2 \\ \vdots \end{bmatrix} + \begin{bmatrix} b_1 \\ b_2 \\ \vdots \end{bmatrix} \quad (6)$$

The weightings $w_{a1}, w_{a2}, \ldots, w_{b1}, w_{b2}, \ldots$ and $b_1, b_2, \ldots$ according to the operating environment, material properties, and other conditions for each hydraulic excavator 10, each component, and each portion are stored in the memory 15b, together with the calculation expression such as expression (6). In one example, a user or a seller of the fatigue management system S can freely change these weightings by inputting information to the input device of the monitor 19B or the input device of the information terminal 160 according to the individual request or environment. The concept of weightings can be set based on the same as described above. For example, the above maps (A) to (D) may be created as weighted maps that set the relationship between the cumulative damage degree d and the weightings $w_a$ and $w_b$ in advance, and a selection may be made under the same conditions as above. The index value calculation section S3 then uses the calculation expression as shown in expression (6), for example, to calculate the fatigue index values $i_1, i_2, \ldots$ from the cumulative damage degree $d_1, d_2, \ldots$ calculated by the damage degree calculation section S2. The fatigue index value i in this case is an index with no upper limit.

The fatigue management system S of the present embodiment includes the index value calculation section S3 functioning as an image generator that generates an image associating various portions of the hydraulic excavator 10 as a construction machine with their fatigue index values. The fatigue management system S of the present embodiment also includes the monitor 19B functioning as an image display that displays an image generated by the image generator. With this configuration, the fatigue management system S shows the fatigue index values visually as shown in FIGS. 7A to 7C, for example.

Figure 7A:
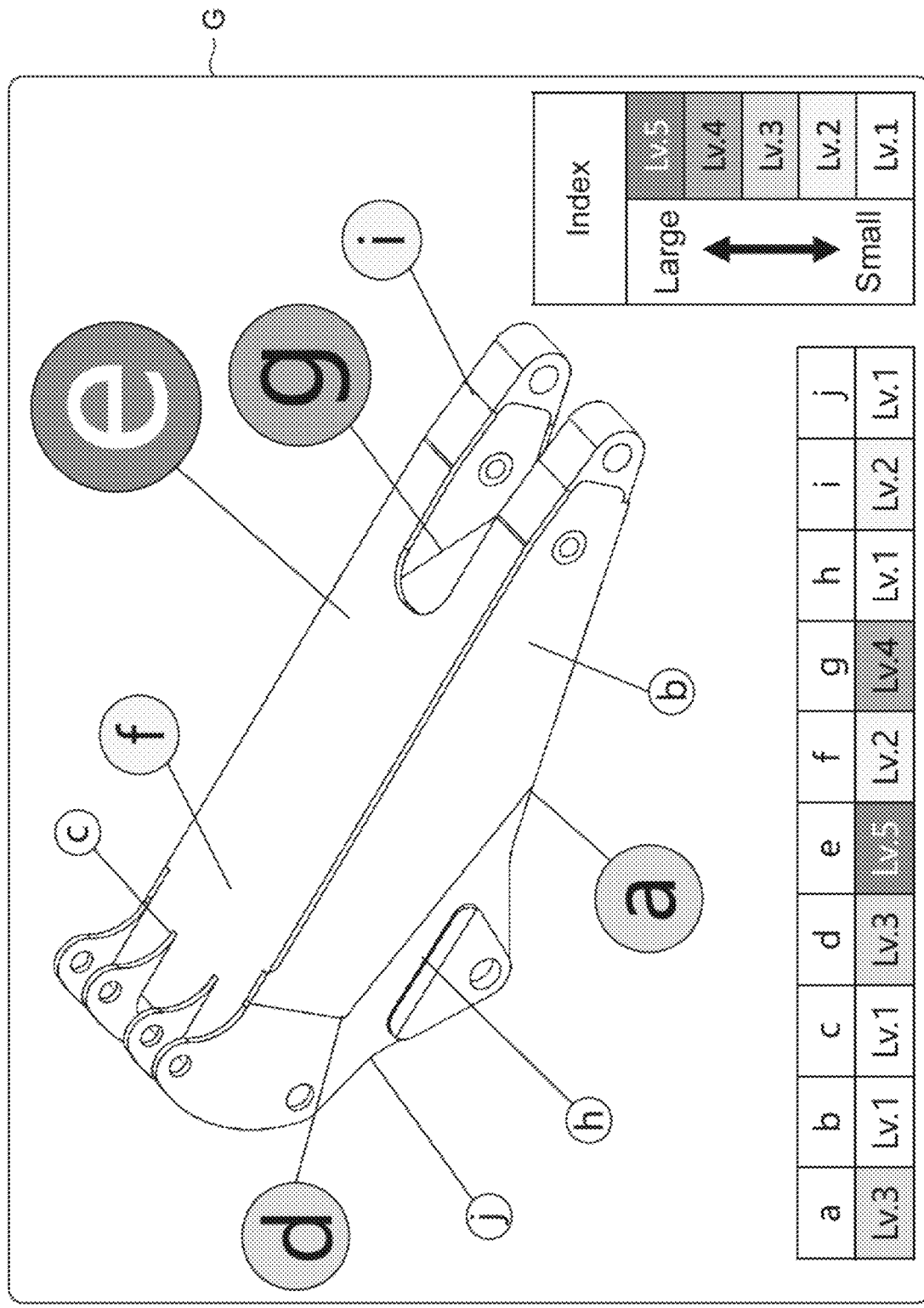
FIG. 7A shows an example of the image displayed on the monitor in the fatigue management system shown in FIG. 2.

FIGS. 7A to 7C show an example of the images G displayed on the monitor 19B of FIG. 2 in the fatigue management system S shown in FIG. 2. FIG. 7A shows an example of the image G displayed on the monitor 19B, associating each of a plurality of portions of the arm 14b of the hydraulic excavator 10 with their corresponding fatigue index values. In this image G, ten arbitrary points from point a to point j are selected from the plurality of portions of the arm 14b. In one example, the fatigue index values are displayed as five-level "index" from level Lv.1 to level Lv.5 for each of the portions of points a to j of the arm 14b. In the five levels, level Lv.1 has the smallest fatigue index value, and level Lv.5 has the largest fatigue index value.

In the example shown in FIG. 7A, the image G shows the image of the arm 14b, lead lines drawn from the portions of points a to j of the arm 14b, and circles having letters inside to indicate the portions that are displayed at the tip ends of the lead lines. In one example, these circles are displayed with a diameter and a color corresponding to the level of the index. Specifically, for instance, the circle has a large diameter for a portion having high index level and fatigue index value, and has a small diameter for a portion having low index level and fatigue index value. For instance, the circle and the cell in the table are colored dark for a portion having high index level and fatigue index value, and are colored light for a portion having low index level and fatigue index value. This provides a visual indication of the fatigue index values for various portions of the components of the hydraulic excavator 10.

FIG. 7B shows an example of the image G displayed on the monitor 19B, associating each of a plurality of portions of the structure constituting the upper slewing body 12 of the hydraulic excavator 10 with their corresponding fatigue index values. FIG. 7C shows an example of the image G displayed on the monitor 19B, associating each of a plurality of portions of the structure constituting the lower traveling body 11 of the hydraulic excavator 10 with their corresponding fatigue index values. Similarly to the example of FIG. 7A, these examples also provide a visual indication of the fatigue index values for various portions of the components of the hydraulic excavator 10. In these examples, the image G shows ten predetermined locations of the arm 14b and the structures of the upper slewing body 12 and the lower traveling body 11. In another example, the image G shows the fatigue index values of any locations having fatigue index values exceeding a preset predetermined fatigue index value in a similar manner.

The fatigue management system S of the present embodiment includes the server 140 that performs data communication with a plurality of construction machines, the memory device 150 connected to the server 140, and the information terminals 160 that perform data communication with the server 140. The information terminals 160 each has a comparison section that compares the degrees of fatigue based on the time series data of the fatigue index values. This configuration enables the fatigue management system to compare the degree of fatigue of a specific portion of the construction machine with the threshold, and thus manage more accurately the degree of fatigue of the specific part of the construction machine. This also enables a comparison of the degree of fatigue among multiple construction machines.

Figure 8:
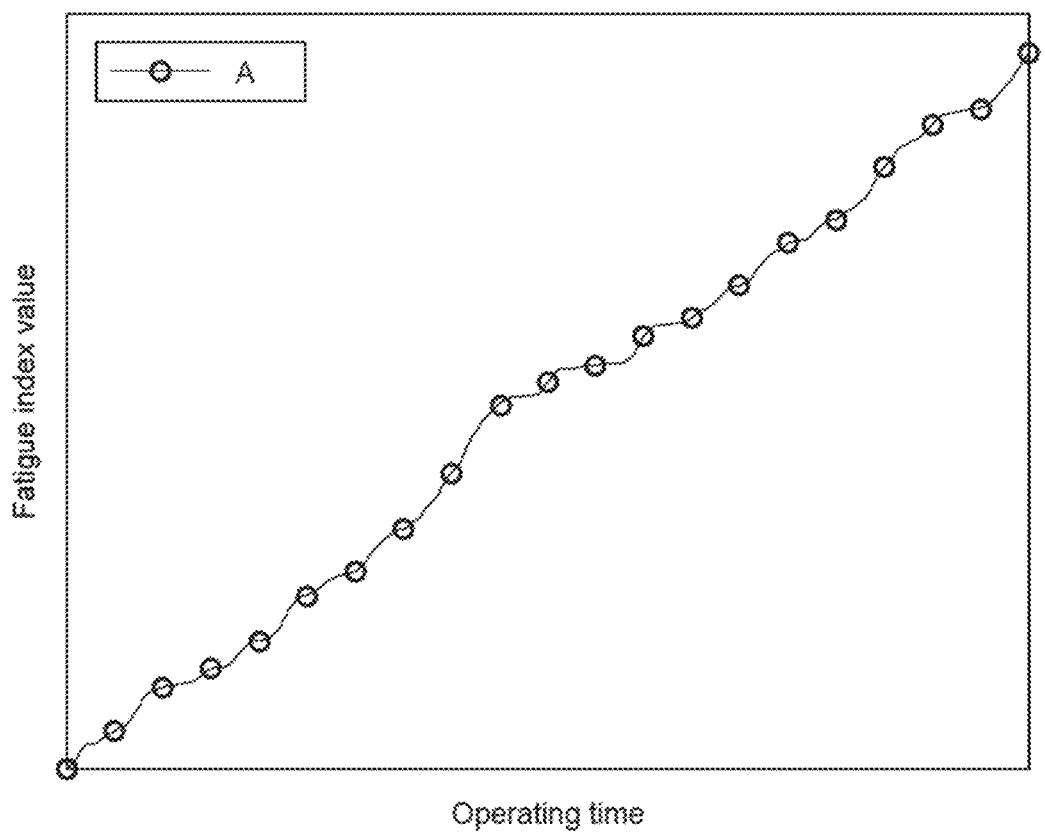
FIG. 8 is a graph showing an example of time-series data of the fatigue index values of a construction machine.

FIG. 8 is a graph showing an example of time-series data of the fatigue index value of a specific construction machine. Specifically, FIG. 8 shows time-series data of the fatigue index value at point e shown in FIG. 7A of the boom 14a of machine A, which is one of the plurality of hydraulic excavators 10. In this way, the system understands the transition of the fatigue degree at point e with the time-series data of the fatigue index value, and when the fatigue degree at point e reaches a predetermined threshold, the system takes appropriate measures, such as issuing an alarm encouraging the inspection.

Figure 9:
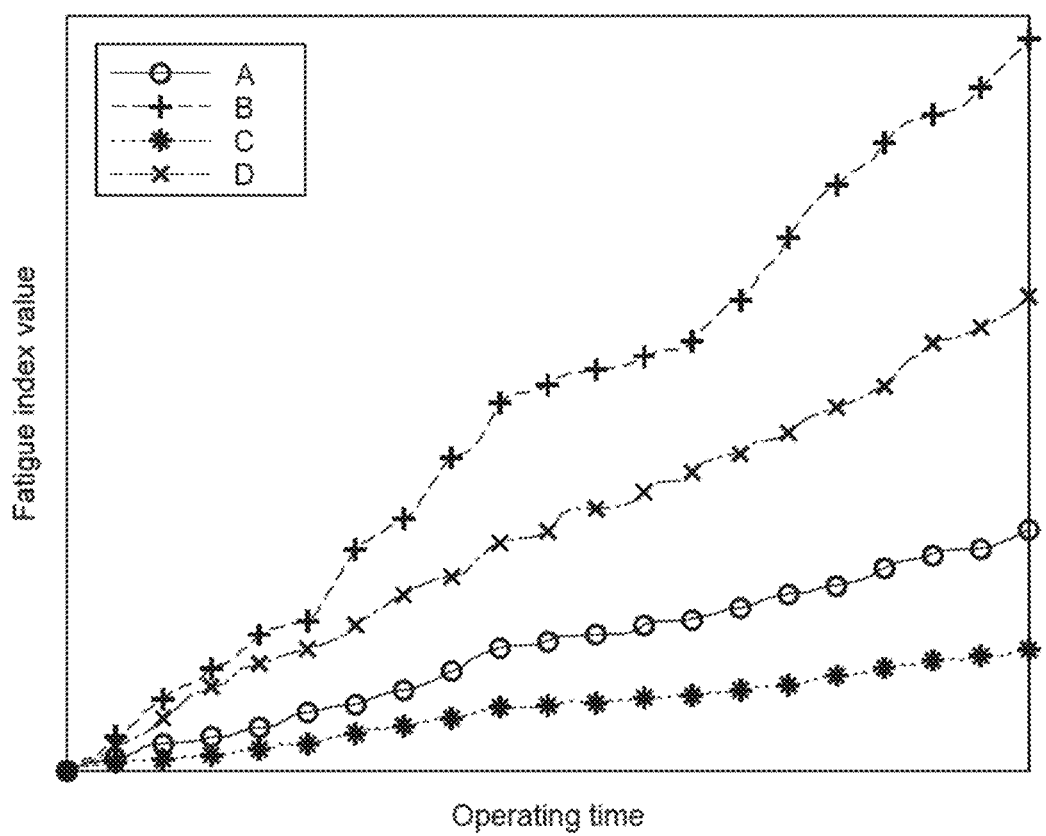
FIG. 9 is a graph showing an example of time-series data of the fatigue index values of a plurality of construction machines.

FIG. 9 is a graph showing an example of time-series data of the fatigue index values of a plurality of construction machines. Specifically, FIG. 9 shows time-series data of the fatigue index values at point e shown in FIG. 7A of the booms 14a of the four machines A to D among the plurality of hydraulic excavators 10. In the example of FIG. 9, the comparison section of the information terminal 160 compares the fatigue degrees of the hydraulic excavators 10 based on the time-series data of the fatigue index values of the four hydraulic excavators A to D. This comparison shows that the fatigue degree of machine B is the highest and that of machine C is the lowest. This makes it possible to create an appropriate work plan according to the fatigue degree of each hydraulic excavator 10 by placing a hydraulic excavator 10 with a high fatigue degree to the work with a low load and placing a hydraulic excavator 10 with a low fatigue degree to the work with a high load, for example. The fatigue index values used in FIGS. 8 and 9 are values obtained as index numbers.

As described above, the present embodiment enables providing a fatigue management system S capable of managing the fatigue of each portion of a construction machine more accurately than conventional systems by using fatigue index values. The construction machine to be managed by the fatigue management system S of this embodiment is not limited to the hydraulic excavator 10.

Figure 10:
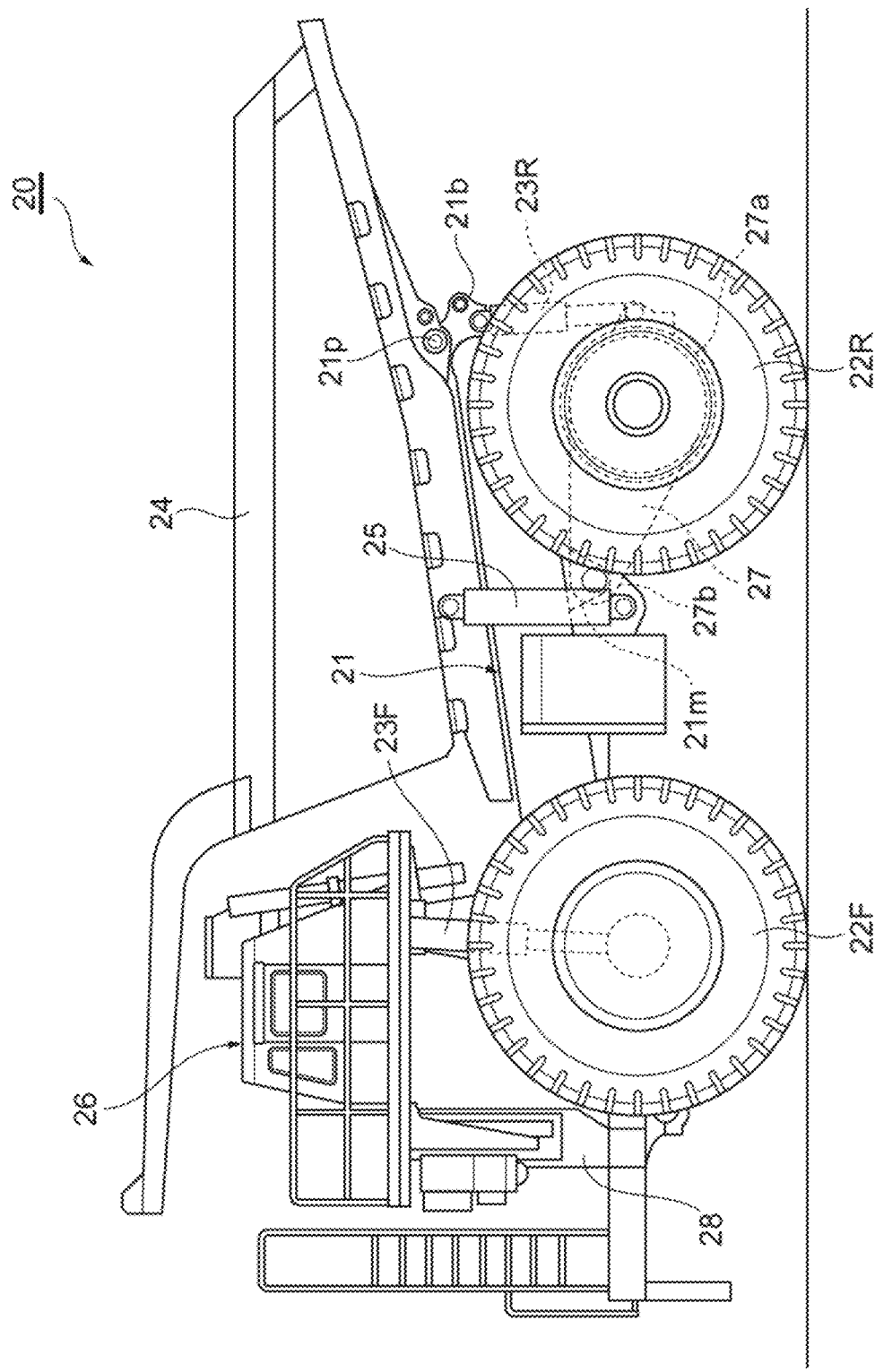
FIG. 10 is a side view of a dump truck that is an example of the object of management by the fatigue management system of the present disclosure.

FIG. 10 is a side view of a dump truck 20 showing another example of a construction machine to be managed by the fatigue management system S. In one example, the dump truck 20 is a large transport vehicle that transports objects to be transported, such as quarried stones from a mine. In one example, the dump truck 20 has a body frame 21, left and right front wheels 22F, left and right rear wheels 22R, left and right front-wheel side suspensions 23F, left and right rear-wheel side suspensions 23R, a body 24, left and right hoist cylinders 25, a cab 26, a traveling driver 27, and a housing 28.

In one example, the body frame 21 is a frame-like structure that supports the front wheels 22F, the rear wheels 22R, the front-wheel side suspensions 23F, the rear-wheel side suspensions 23R, the body 24, the hoist cylinders 25, the cab 26, the traveling driver 27, and the housing 28.

The left and right front wheels 22F are steering wheels rotatably supported at the front portion of the body frame 21. The left and right rear wheels 22R are drive wheels rotatably supported at the rear portion of the body frame 21. The left and right front-wheel side suspensions 23F are mounted at the front of the body frame 21 and elastically support the left and right front wheels 22F.

The left and right rear-wheel side suspensions 23R are mounted at the rear of the body frame 21 and elastically support the left and right rear wheels 22R. The upper ends of the left and right rear-wheel side suspensions 23R are attached to left and right brackets 21b placed at the rear of the body frame 21. The lower ends of the left and right rear-wheel side suspensions 23R are attached to an axel housing 27a of the travelling driver 27.

The body 24 is a large container that is tiltably mounted on the body frame 21 and has a length of more than 10 meters in the front-rear direction of the dump truck 20, for example. The body 24 carries a large amount of mined crushed stone, for example. In one example, the rear portion of the body 24 at the bottom is connected to the left and right brackets 21b of the body frame 21 via connecting pins 21p, and the front portion at the bottom is connected to the upper end of the hoist cylinders 25.

The left and right hoist cylinders 25 each have a lower end that is rotatably connected to the body frame 21 and an upper end that is rotatably connected to the body 24. In one example, the hoist cylinders 25 are hydraulic cylinders. This configuration allows the body 24 to, in response to the expansion of the hoist cylinders 25, rotate around the connecting pins 21p, so as to tilt to the discharge position where the front portion is located above and the rear portion is located below. When the hoist cylinders 25 contracts from this state, the body 24 rotates in the reverse direction around the connecting pins 21p and returns to the loading position shown in FIG. 10.

The traveling driver 27 is connected to the left and right rear wheels 22R and rotationally drives them. In one example, the traveling driver 27 has an axle housing 27a and a bracket 27b. In one example, the axle housing 27a has a cylindrical shape extending to the left and right, accommodating a traveling motor, a speed reducer, and the like, which are not shown in the drawing. In one example, the bracket 27b projects forward from the axle housing 27a. The front end of the bracket 27b is rotatably attached to a mount 21m of the body frame 21.

The housing 28 defines a machine room at the front of the body frame 21. The housing 28 accommodates an engine, a hydraulic pump, and the like, which are not shown in the drawing. The cab 26 is placed on a flat floor located at the top of the housing 28. The cab 26 has a box shape, and defines the space where the operator gets on. Although not shown, a seat on which the operator sits, a steering wheel, an operation pedal, and the like are installed in the cab 26.

In one example, the dump truck 20 includes a controller similar to the controller 15 for the hydraulic excavator 10 shown in FIG. 2. In one example, the controller of the dump truck 20 includes a stress calculation section S1, a damage degree calculation section S2, and an index value calculation section S3. The dump truck 20 also includes an attitude sensor for detecting the attitude of the dump truck 20. In one example, the attitude sensor includes an acceleration sensor.

The cylinders of the front-wheel side suspensions 23F and the rear-wheel side suspensions 23R of the dump truck 20 each include a hydraulic sensor similar to the hydraulic sensor 18b of the hydraulic excavator 10. In one example, the hydraulic sensors of the dump truck 20 are force sensors that detect forces acting on the front-wheel side suspensions 23F and the rear-wheel side suspensions 23R. In one example, the dump truck 20 includes a transmitter 19A and a monitor 19B similar to those in the above-mentioned hydraulic excavator 10 shown in FIG. 2.

Similarly to the hydraulic excavator 10 as described above, the fatigue management system S of the present embodiment manages the fatigue of each portion of the components of the dump truck 20 more accurately than the conventional systems.

Specifically, the fatigue management system S includes the stress calculation section S1, the damage degree calculation section S2, and the index value calculation section S3 as described above. Similarly to the hydraulic excavator 10 as stated above, this configuration enables the fatigue management system S to manage the fatigue of each portion of the dump truck 20 more accurately than the conventional systems, according to the conditions specific to each dump truck 20, each component of the dump truck 20, and each of a plurality of portions of the components, for example.

Figure 11:
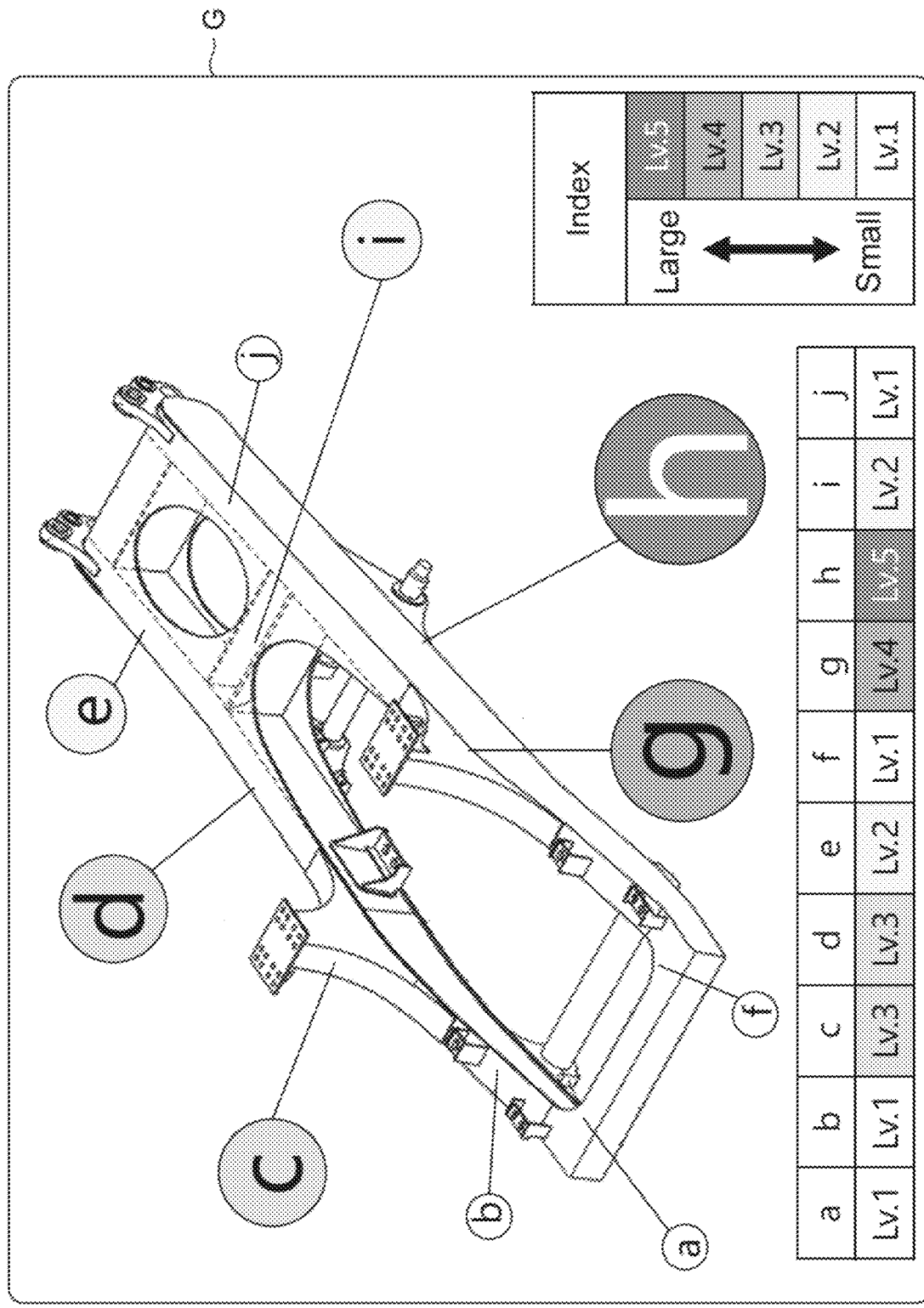
FIG. 11 shows an example of the image displayed on the monitor in the fatigue management system.

FIG. 11 shows an example of a monitor image of the fatigue management system S of the present embodiment. FIG. 11 shows an example of the image G displayed on the monitor 19B, associating each of a plurality of portions of the body frame 21 of the dump truck 20 with their corresponding fatigue index values. Similarly to the example of FIGS. 7A to 7C, the fatigue management system S of the present embodiment also provides a visual indication of the fatigue index values for various portions of the components of the dump truck 20.

That is a detailed description of the embodiments of the fatigue management system of the present disclosure, with reference to the drawings. The specific configuration of the present disclosure is not limited to the above-stated embodiments, and the design may be modified variously without departing from the spirits of the present disclosure. The present disclosure also covers such modified embodiments.

REFERENCE SIGNS LIST

1 Hydraulic cylinder
10 Hydraulic excavator (construction machine)
15b Memory
18 Sensor
18a Angle sensor (attitude sensor)
18b Hydraulic sensor (force sensor, pressure sensor)
18c Angular rate sensor (attitude sensor)
18d Acceleration sensor (attitude sensor)
18e Inclination angle sensor (attitude sensor)
19B Monitor (image display)
20 Dump truck (construction machine)
140 Server
150 Memory device
160 Information terminal (comparison section)
G Image
S Fatigue management system
Stress calculation section
S2 Damage degree calculation section
S3 Index value calculation section (image generator)

The invention claimed is:
1. A fatigue management system comprising:
a controller configured to receive an output of a sensor attached to a part of a construction machine; and
an image display configured to display an image, wherein the controller includes:
   a stress calculation section configured to calculate stress acting on a plurality of portions of the construction machine based on the output of the sensor;

a damage degree calculation section configured to calculate cumulative damage degree of each portion based on the stress;

an index value calculation section configured to calculate a fatigue index value, which is a weighted degree of the cumulative damage degree and which is a value that varies in degree of change with respect to an increase of the cumulative damage degree, for each portion; and an image generator configured to generate an image of various portions of the construction machine in association with the fatigue index values, wherein the image display is further configured to display the image of various portions of the construction machine in association with the fatigue index values.

2. The fatigue management system according to claim 1, wherein the sensor includes a force sensor that detects a force acting on the construction machine and an attitude sensor that detects an attitude of the construction machine.

3. The fatigue management system according to claim 1, further comprising a memory that stores a condition for selecting one of fatigue index values or numerical value for the weighting for each portion among a plurality of differently weighted fatigue index values or numerical values for the weighting, wherein the index value calculation section selects one of the fatigue index values or one of the numerical values for the weighting for each portion in accordance with the condition.

4. The fatigue management system according to claim 3, wherein the memory stores as the condition:

a coincident degree between actual stress acting on the portion and the stress calculated by the stress calculation section;

a threshold of the coincident degree; a first map configured to increase the fatigue index value with an increase in the cumulative damage degree; and a second map configured to increase the fatigue index value earlier than the first map with an increase in the cumulative damage degree, and the index value calculation section:

selects the first map for the portion having the coincident degree that is equal to or higher than the threshold, and selects the second map for the portion having the coincident degree that is lower than the threshold.

5. A fatigue management system comprising:

a server that performs date communication with a construction machine;

a memory device that is connected to the server; and an image display that displays an image, wherein the server and the memory device include a stress calculation section configured to calculate stress acting on a plurality of portions of the construction machine based on an output of a sensor attached to a part of the construction machine;

a damage degree calculation section configured to calculate cumulative damage degree of each portion based on the stress;

an index value calculation section configured to calculate a fatigue index value, which is a weighted degree of the cumulative damage degree and which is a value that varies in degree of change with respect to an increase of the cumulative damage degree, for each portion; and an image generator configured to generate an image of various portions of the construction machine in association with the fatigue index values, wherein the image display configured to display the image of various portions of the construction machine in association with the fatigue index values.

6. The fatigue management system according to claim 5, wherein the sensor includes a force sensor that detects a force acting on the construction machine and an attitude sensor that detects an attitude of the construction machine.

7. The fatigue management system according to claim 5, further comprising:

a memory that stores a condition for selecting one of fatigue index values or numerical value for the weighting for each portion among a plurality of differently weighted fatigue index values or numerical values for the weighting, wherein the index value calculation section selects one of the fatigue index values or one of the numerical values for the weighting for each portion in accordance with the condition.

8. The fatigue management system according to claim 5, wherein the fatigue management system further comprises:

an information terminal that performs data communication with the server, wherein the information terminal has a comparison section that compares a degree of fatigue based on time series data of the fatigue index value.

* * * * *